United States Patent
Zamoum et al.

(10) Patent No.: US 11,304,241 B2
(45) Date of Patent: Apr. 12, 2022

(54) METHOD AND SYSTEM FOR TRANSMITTING DATA PACKETS VIA A RANDOM ACCESS (RA) TRANSMISSION CHANNEL

(71) Applicants: THALES, Courbevoie (FR); CENTRE NATIONAL D'ETUDES SPATIALES, Paris (FR); INSTITUT SUPERIEUR DE L'AERONAUTIQUE ET DE L'ESPACE, Toulouse (FR);

(Continued)

(72) Inventors: Selma Zamoum, Toulouse (FR); Mathieu Gineste, Toulouse (FR); Jérôme Lacan, Toulouse (FR); Marie-Laure Boucheret, Toulouse (FR); Jean-Baptiste Dupe, Toulouse (FR)

(73) Assignees: THALES, Courbevoie (FR); CENTRE NATIONAL D'ETUDES SPATIALES PARIS, FRANCE, Paris (FR);

(Continued)

( * ) Notice: Subject to any disclaimer, the term of this patent is extended or adjusted under 35 U.S.C. 154(b) by 0 days.

(21) Appl. No.: 17/052,183

(22) PCT Filed: May 2, 2019

(86) PCT No.: PCT/EP2019/061181
§ 371 (c)(1),
(2) Date: Oct. 31, 2020

(87) PCT Pub. No.: WO2019/211351
PCT Pub. Date: Nov. 7, 2019

(65) Prior Publication Data
US 2021/0368552 A1 Nov. 25, 2021

(30) Foreign Application Priority Data
May 3, 2018 (FR) .................................... 1800424

(51) Int. Cl.
*H04B 7/185* (2006.01)
*H04W 74/08* (2009.01)
*H04W 84/06* (2009.01)

(52) U.S. Cl.
CPC .... *H04W 74/0841* (2013.01); *H04B 7/18517* (2013.01); *H04B 7/18582* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 2006/0171418 A1* | 8/2006 | Casini | H04L 49/90 370/474 |
| 2010/0124222 A1* | 5/2010 | Liva | H04W 74/08 370/389 |

(Continued)

FOREIGN PATENT DOCUMENTS

| | | |
|---|---|---|
| EP | 1 686 746 A1 | 8/2006 |
| EP | 3 028 396 A1 | 6/2016 |
| WO | 2015/015099 A1 | 2/2015 |

OTHER PUBLICATIONS

Bui, et al., "A Multi-Replica Decoding Technique for Contention Resolution Diversity Slotted Aloha", 2015 IEEE 82nd Vehicular Technology Conference (VTC2015-Fall), Sep. 6, 2015.

(Continued)

*Primary Examiner* — Kodzovi Acolatse
(74) *Attorney, Agent, or Firm* — BakerHostetler

(57) ABSTRACT

A method for transmitting data packets through a random-access (RA) transmission channel shared by a plurality of (Continued)

user terminals uses and exploits a function F for assigning and distributing transmission resources F(u) to the user terminals, knowledge of the graph of which is shared by the sending user terminals and the receiving station in a preliminary step. During the decoding of the received packets, the graph {(u, F(u)} of the assigning and distributing function is exploited by the receiving station to minimize, or even to decrease to zero, the number of replica-location correlations required in case of failure of the conventional CRD-SA protocol decoding process.

25 Claims, 15 Drawing Sheets

(71) Applicants: INSTITUT NATIONAL POLYTECHNIQUE DE TOULOUSE, Toulouse (FR); CENTRE NATIONAL DE LA RECHERCHE SCIENTIFIQUE, Paris (FR)

(73) Assignees: INSTITUT SUPERIEUR DE L'AERONAUTIQUE ET DE L'ESPACE TOULOUSE, FRANCE, Toulouse (FR); INSTITUT NATIONAL POLYTECHNIQUE DE TOULOUSE, Toulouse (FR); CENTRE NATIONAL DE LA RECHERCHE SCIENTIFIQUE, Paris (FR)

(56) References Cited

U.S. PATENT DOCUMENTS

| | | | |
|---|---|---|---|
| 2014/0301209 A1* | 10/2014 | Gineste | H04L 47/28 370/236 |
| 2016/0149627 A1* | 5/2016 | De Gaudenzi | H04W 74/0833 370/329 |
| 2017/0099683 A1* | 4/2017 | Niddam | H04W 74/0833 |
| 2017/0150528 A1* | 5/2017 | Becker | H04L 1/00 |
| 2017/0245185 A1* | 8/2017 | Chuberre | H04L 43/0882 |
| 2019/0230658 A1* | 7/2019 | Gadat | H04W 4/70 |
| 2019/0273590 A1* | 9/2019 | Becker | H04L 5/0026 |

OTHER PUBLICATIONS

Zidane, et al., "Enhancement of MARSALA random access with coding schemes, power distributions and maximum ratio combining", 2016 8th Advanced Satellite Multimedia Systems Conference and the 14th Signal Processing for Space Communications Workshop (ASMS/SPSC), Sep. 5, 2016.

Boyd, et al., "Combinatorial code designs for ultra-reliable IoT random access", 2017 IEEE 28th Annual International Symposium on Personal, Indoor, and Mobile Radio Communications (PIMRC), Oct. 8, 2017.

Casini, et al., "Contention Resolution Diversity Slotted ALOHA (CRDSA): An Enhanced Random Access Schemefor Satellite Access Packet Networks", IEEE Transactions on Wireless Communications, vol. 6, Issue: 4, pp. 1408-1419, Apr. 1, 2007.

Zamoum, et al., "Shared Position Technique for Interfered Random Transmissions in Satellite Communications", 2018 9th Advanced Satellite Multimedia Systems Conference and the 15th Signal Processing for Space Communications Workshop (ASMS/SPSC), Sep. 10, 2018.

* cited by examiner $E_{1,1}$

Level $i = 1$

| $g_0$ | $g_1$ | $g_2$ | $g_3$ |
|---|---|---|---|
| $U_1$ 0 4 | $U_5$ 0 5 | $U_9$ 0 6 | $U_{13}$ 0 7 |
| $U_2$ 1 5 | $U_6$ 1 6 | $U_{10}$ 1 7 | $U_{14}$ 1 4 |
| $U_3$ 2 6 | $U_7$ 2 7 | $U_{11}$ 2 4 | $U_{15}$ 2 5 |
| $U_4$ 3 7 | $U_8$ 3 4 | $U_{12}$ 3 5 | $U_{16}$ 3 6 |
| $G_{1,0}$ | $G_{1,1}$ | $G_{1,2}$ | $G_{1,3}$ |

FIG.9A

Level $i = 2$ $E_{2,1}$ , $E_{2,2}$

| $g_0$ | $g_1$ | $g_2$ | $g_3$ |
|---|---|---|---|
| $U_{17}$ 0 2 | $U_{19}$ 0 3 | $U_{21}$ 4 6 | $U_{23}$ 4 7 |
| $U_{18}$ 1 3 | $U_{20}$ 1 2 | $U_{22}$ 5 7 | $U_{24}$ 5 6 |
| $G_{2,0}$ | $G_{2,1}$ | $G_{2,2}$ | $G_{2,3}$ |

FIG.9B

Level $i = 3$

| $E_{3,1}$ | $E_{3,2}$ | $E_{3,3}$ | $E_{3,4}$ |
|---|---|---|---|
| $U_{25}$ 0 1 | $U_{26}$ 2 3 | $U_{27}$ 4 5 | $U_{28}$ 6 7 |
| $g_0$ | $g_1$ | $g_2$ | $g_3$ |
| $G_{3,0}$ | $G_{3,1}$ | $G_{3,2}$ | $G_{3,3}$ |

METHOD AND SYSTEM FOR TRANSMITTING DATA PACKETS VIA A RANDOM ACCESS (RA) TRANSMISSION CHANNEL

CROSS-REFERENCE TO RELATED APPLICATIONS

This application is a National Stage of International patent application PCT/EP2019/061181, filed on May 2, 2019, which claims priority to foreign French patent application No. FR 1800424, filed on May 3, 2018, the disclosures of which are incorporated by reference in their entirety.

FIELD OF THE INVENTION

The present invention relates to a method and a system for transmitting data packets through a random-access (RA) transmission channel shared by a plurality of users and using an ALOHA protocol or a derivative thereof.

BACKGROUND

In particular, the invention aims to solve, to a large degree, access conflicts that occur when two or more user terminals seek to transmit simultaneously through said RA channel.

The invention is for example applicable in the context of a return channel via satellite of a multiple access, i.e. multiuser, system as defined in the DVB-RCS2 standard (DVB-RCS standing for Digital Video Broadcasting-Return Channel via Satellite). The frequency band used for this return channel is divided into two portions, a first portion for dedicated access and a second portion for random access. Generally, it may be assumed that with each gateway of a plurality of gateways (GW) forming the interface between the terrestrial network and the satellite network are associated a number $N_U$ of subscribers or user terminals that emit at a given frequency. This number $N_U$ depends on the capacity allocated to each gateway GW and on the capacity of user terminals in service in the communication system, which capacity is distributed between the gateways GW; furthermore, this number $N_U$ varies depending on the application used.

Below, the processing operations of the method that are described below relate to a single RA transmission channel on a single frequency and may be applied in two different random-access modes, a synchronous first access mode or an asynchronous second access mode.

In the synchronous first access mode, which is the preferred access mode, the transmissions performed by the user terminals associated with a given gateway are carried out in frames that are each divided into $N_S$ time slots. Each user terminal will send, in the transmission system, a preset number $N_R$, higher than or equal to 2, of times the same packet in a given frame having a preset number $N_S$ of time slots in the form of $N_R$ replicas contained in $N_R$ different time slots, and must wait for the next frame to transmit another packet. The user terminals are synchronized with one another and receive, as things progress, synchronization tables.

Differently, in the asynchronous second access mode, to each user terminal is allocated a virtual frame in which said terminal transmits the $N_R$ replicas of the same packet to the receiving station without any synchronization between the various virtual frames.

In both the synchronous and asynchronous access modes, the receiving station, which may be the satellite or the gateway GW to the terrestrial network, implements a successive interference cancellation (SIC) process that allows all the replicas of the packet of the frame to be removed once at least one of the $N_R$ replicas has been correctly demodulated and decoded.

One of the problems to be solved in the use of a method for transmitting data packets through an RA transmission channel shared by a plurality of users and using an ALOHA protocol or a derivative thereof is how, at a receiver, to receive a plurality of signals arriving simultaneously and originating from a plurality of different sources. Specifically, this plurality of simultaneously arriving signals is, from the point of view of each signal, a source of interference that may lead to the loss of certain or all the transported data. These data losses are the main cause of the decreases in bit rates that may be observed in this type of transmission channel.

To solve this problem, a CRD-SA protocol (CRD-SA standing for contention resolution diversity slotted ALOHA) has been proposed and described in patent EP 1 686 746 B1.

In this CRD-SA protocol, which uses a synchronous access mode, a plurality of replicas of a given data packet are sent and successive interference cancellation (SIC) is employed in order to increase the probability of each packet being decoded in synchronous mode.

More precisely, the CRD-SA protocol consists in transmitting, in various time slots, a plurality of replicas of a given data packet randomly, over the RA transmission channel. Each of the replicas contains signaling information indicating the respective position of the one or more other replicas of the same packet. On reception of the corresponding signal, a decoder scans the entire frame with a view to attempting to decode one or more replicas of a given packet. A replica is decodable in the CRD-SA protocol if and only if it has not collided with other replicas in a given time slot. Once a replica is decoded, the corresponding signal is generated. Subsequently, by virtue of the use of the signaling information contained in the generated signal, it is possible to determine the position of the other replicas of the same packet in the frame.

Hence, the decoded replica allows a signal to be recreated that may be subtracted from the signal received in the time slots of replicas affected by interference corresponding to the same packet, so as to free the overall signal from interference effects corresponding to replicas affected by interference. This process is iterative and continues until the receiver successfully decodes a packet that is being processed, or indeed reaches a point of failure at which no further decoding is possible, in which case the process ends in failure.

Independently of the coding and modulation used, this point of failure highlights the weakness of this conventional CRD-SA method or of a conventional asynchronous-mode ACRDA protocol employing a corresponding decoding process. This weakness resides in the fact that decoding is possible if and only if a replica of a packet has not collided with other replicas in a time slot. However, it is possible for situations to occur in which all of the time slots of the frame comprise one or more collisions, thus preventing the decoding method of this conventional CRD-SA protocol from working.

In order to mitigate this weakness, a receiving and decoding method that is an improvement on the decoding method of the CRD-SA protocol has been proposed and described in patent EP 3 028 396 B1. This receiving and decoding protocol uses an algorithm known by the algorithm MARSALA (Multi-replicA decoding using corRelation baSed locaALizAtion). According to patent EP 3 028 396 B1 and as known, the receiving and decoding method using the MARSALA algorithm allows the conventional CRD-SA protocol receiving and decoding method to succeed whereas before it would have failed. This step of receiving and decoding using the MARSALA algorithm comprises a step of locating replicas in the time slots of a given frame by computing correlations between the respective baseband signals contained in different time slots over the entire frame. Subsequently, once the replicas have been located, the parameters of the transmission channel, such as the time, frequency or phase shift, are corrected in order then to allow the replicas of the packet to be combined together in a consistent way. It is this combination that allows a higher signal-to-noise ratio than that observed in the case where the technique is limited to a receiving and decoding method employing only the CRD-SA protocol to be achieved, and thus a higher decoding probability to be obtained. For example, the combination or summation of the replicas allows the power of the packet of interest to be quadrupled in the case of a CRD-SA protocol employing two replicas, to achieve a higher decoding probability.

It is thus possible, using the MARSALA algorithm to decrease the packet loss rate of packets transmitted through a time-division RA transmission channel, this allowing performance in terms of the bit rate of the communication system to be improved.

However, this algorithm requires a considerable number of inter-slot baseband correlations to locate replicas, and hence adds processing complexity related to the computation of this high number of correlations used to locate the replicas of these packets and to correct the parameters of the channel with a view to combination of said replicas before decoding is attempted.

A first technical problem that the invention addresses is that of providing a method and a system for transmitting data packets replicated a number of times over an RA transmission channel, wherein a method for processing and decoding the received signal, subsequent to failure of the conventional decoding method of the CRD-SA protocol, allows one or more data packets that have collided to be decoded via a relevant combination of certain replicas of a given packet and removal of these replicas from the corresponding time slots of the received signal, and allows the complexity of said processing in terms of number of replica-location baseband correlations between the signal contained in a reference time slot and the signals contained in different time slots of the same frame to be decreased.

The second technical problem that the invention addresses is that of providing a transmitting method and system that solves the first technical problem, and that increases the efficacy of resolution of conflicts in replicas between different packets, i.e. also decreases the packet loss rate in the RA transmission channel.

SUMMARY OF THE INVENTION

To this end, one subject of the invention is a method for transmitting data packets through a random-access (RA) transmission channel shared by a plurality of user terminals, the transmitting method being implemented by a communication system comprising: a receiving station; and a plurality of at least two user terminals that are actively connected to the receiving station, and a random-access (RA) transmission channel for transmission from the plurality of user terminals to the receiving station, using a time-diverse random-access protocol with resolution of inter-packet conflict.

The transmitting method is characterized in that it comprises steps consisting in that:

in a preliminary first step, a function F for assigning and distributing transmission resources F(u) shared by the plurality (8) of user terminals u connected to the receiving station, which function is defined by a graph $\{(u, F(u))\}$, in which u designates an identification and turn index of the user terminals of the plurality and the transmission resource F(u) associated with a user terminal u includes positions of an integer number $N_R$, higher than or equal to 2, of replicas of a packet to be sent by the terminal u, selected from the ranks of time slots of a send time frame, and an acquisition sequence to be inserted in each of the $N_R$ replicas, selected from a family of quasi-orthogonal pseudo-random binary sequences, is determined; then to each connected user terminal u of the plurality is delivered the associated component of the graph $\{(u, F(u))\}$ whereas the entirety of the graph is made available to the receiving station; then in a second step, each user terminal u of the plurality randomly generates $N_R$ replicas of a packet to be transmitted in the time slots of the send frame having the temporal positions assigned by the graph component of said terminal and in which is inserted the acquisition binary sequence assigned by the graph component of said terminal; and in a third step of decoding received packets, the graph $\{(u, F(u))\}$ of the assigning and distributing function is exploited by the receiving station to combine signals having the same acquisition signal in the $N_R$ possible positions of replicas of a given packet, in order to minimize, or even decrease to zero, the number of correlations in replica location that are required, between complex baseband data signals of different time slots, during the resolution of inter-packet interference conflicts that are not resolvable using the conventional decoding process of the time-diverse random-access protocol with resolution of inter-packet conflict.

According to particular embodiments, the transmitting method comprises one or more of the following features, alone or in combination:

the family of quasi-orthogonal pseudo-random binary sequences is chosen from the codes used by code-division multiple-access systems, such as Gold codes and extended-length Gold codes; and/or the acquisition binary sequence is located in the header by way of preamble or inside or in the tail of each replica; and/or each transmitted replica comprises one or more guard symbols defining a guard interval;

the second step comprises a substep of coding the replica with a redundancy check and/or a FEC code, said coding substep being performed before the insertion of an acquisition binary sequence;

the second step comprises a substep of inserting signaling information, executed before the substep of coding the replica;

the random transmission channel shared by the user terminals is a wireless return transmission channel and the receiving station is a satellite or a gateway for connection to a terrestrial communication network or a station of a terrestrial communication network;

the decoding third step comprises: a fourth step of collecting and decoding packets using a conventional CRD-SA decoding protocol or a fifth step of collecting and decoding packets using an ACRDA protocol, the fourth or fifth step being executed after the first and second steps respectively on a current reception physical frame or in a moving window encompassing a certain number of virtual frames specific to the user terminals; and a sixth step of complementary analyzing and processing to decode packets affected by interference that are not resolved in the fourth step or fifth step, the sixth step being triggered when at least one packet affected by interference of the frame is not resolved during the execution of the fourth or fifth step;

the fourth step of collecting and decoding using a conventional CRD-SA decoding protocol comprises a second set of substeps consisting in: identifying, inside a received signal, replicas that have not been affected by destructive collisions with replicas of other packets; then extracting the information contained in the identified replicas; temporally locating the one or more other replicas of the same packet using the information on the temporal positions of the replicas delivered by the components of the graph $\{(u, R(u)\}$ and/or signaling information extracted from the decoded and identified replicas; erasing, in complex baseband, said one or more other replicas using an interference erasing algorithm, when it or they are affected by destructive collisions with replicas of other packets; and identifying other packets that, after said erasing substep, are no longer affected by destructive collisions and extracting the information that is contained therein;

the function F, designated by $F_{PSR}$ according to a first embodiment, is a pseudo-random deterministic function for assigning and distributing position vectors of the $N_R$ replicas of the packets within the time frame and of the acquisition sequences associated with the packets and each of the replicas thereof that depend on the user terminals of the plurality (8) via an input seed of the function $F_{PSR}$ which depends in a representative way on the identifier of each terminal, the distribution of the vectors of the positions of the $N_R$ replicas and of the acquisition sequences of the distributing function $F_{PSR}$ having a distribution profile that is substantially uniform over the set of all the possible vectors of positions of $N_R$ replicas and of all the possible acquisition sequences when the number of user terminals is sufficiently high;

for each user terminal u, the seed x(u) associated with the user terminal u is set temporally and represents the identifier HID(u) of the terminal u; or for each terminal u, the seed x(u) associated with the user terminal u is dynamic and varies between each frame, this especially being achieved using an algorithm representative of the variations in the product of the identifier HID of the terminal u and an identifier FID of the frame, the latter identifier being representative of the temporal rank of the frame in a sequential order of frame advance;

the pseudo-random deterministic distributing function $F_{PSR}$ is parameterized by the total number $N_S$ of time slots per frame and the total number $N_P$ of acquisition sequences;

the sixth step comprises a third set of substeps consisting in: selecting arbitrarily or according to a preset criterion a reference time slot in the frame being processed from time slots for which an unresolved packet conflict has been detected; then choosing arbitrarily or according to a preset criterion in the selected reference time slot a detected acquisition sequence chosen from one or more acquisition sequences detected in said reference time slot; then determining the positions in the frame being processed of the possible replicas of a given packet associated with the detected and chosen acquisition sequence on the basis of all the positions of the times slots of the frame in which the detected and chosen acquisition sequence has been detected by short correlation and on the basis of the graph $\{u; F_{PSR}(u)\}$; then computing the possible replica-location correlations between the baseband signal received in the reference time slot and the band signals of the time slots having the positions determined in substep of determining the positions of the possible replicas; then determining the time slots of the replicas of the packet of the time slot associated with the chosen detected acquisition sequence to be the time slots having a location-correlation value higher than a preset location-correlation value; then in a combining substep, computing the sum of the baseband signals of the located replicas of the packet of the time slot associated with the chosen detected acquisition sequence; then demodulating and decoding the computed sum when the sum has a noise level located below a set noise threshold; then subtracting in baseband from the signal being processed the demodulated and decoded signal of the located replicas of the packet of the time slot associated with the chosen detected acquisition sequence;

the one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which a correlation peak has a value higher than or equal to a preset first short-correlation threshold, or the one or more detected acquisition sequences are determined by computing a plurality of values of short correlations in baseband between the reference patterns of the possible acquisition sequences expected in the reference time slot and the signals contained in time slots for which the use of the reference patterns expected in the reference time slot is possible by virtue of the graph $\{u; F_{PSR}(u)\}$, and by selecting, as detected acquisition sequences, the acquisition sequences for each of which the sum of the squares of the moduli of the correlation values corresponding to a given reference pattern has a value higher than or equal to a preset second short-correlation threshold;

the detection by short correlation of the one or more acquisition sequences in the reference time slot is performed during the conventional decoding process of the CRD-SA protocol, a little before it fails and is suspended, or in an intermediate substep of detecting by short correlation, which substep is interposed between the substeps of selecting a reference time slot and of choosing a chosen detected acquisition sequence; and the detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between the substeps of selecting a reference time slot and of choosing a chosen detected acquisition sequence;

the transmitting method furthermore comprises a substep of estimating frequency, delay, phase and amplitude parameters of each located replica, serving to compute the sum signal in baseband, the estimating substep being executed after the replica-locating substep;

the function F for assigning and distributing resources, which is designated by $F_{SMART}$ according to a second embodiment, is a "smart" deterministic function for assigning and distributing position vectors of the $N_R$ replicas within each frame among the set of all the possible vectors of positions of $N_R$ replicas in all of the time slots of the frame and of the acquisition sequences associated with the various sent replicas among all the possible acquisition sequences, determined so as to minimize, or even decrease to zero, the number of possible data loops in which the connected user terminals of the plurality use the same replica positions;

the graph $\{(u, F_{SMART}(u)\}$ is determined so as to make correspond, to each used acquisition sequence gj of the set $\{gj\}$ of acquisition sequences, a set Tj of user terminals Ujk and a plurality of vectors Vjk(Pgj(1), ... , Pgj($N_R$)) of positions of $N_R$ replicas, which differ from one another in at least one position;

the number $N_R$ of replicas transmitted per packet is equal to two, and the number of time slots per frame is an even number, and the number $N_P$ of acquisition sequences gj of the set $\{gj\}$ of acquisition sequences is equal to half the number $N_S$ of time slots per frame, j designating an identification index of the acquisition sequence varying from 0 to $N_P-1$; and the cardinal $N_U$ of the plurality (8) of user terminals is equal to the maximum number of user terminals using only detections based on the acquisition sequences, according to the relationship:

$$N_U = N_S * N_S/4$$

the number $N_R$ of replicas transmitted per packet is equal to two, and the number $N_S$ of time slots for each frame is a power of 2 that is written: $N_S = 2^{N_L}$, $N_L$ designating the number of circular-shift levels, and the number $N_P$ of acquisition sequences gj of the set $\{gj\}$ of acquisition sequences is equal to half the number $N_S$ of time slots per frame, j designating an identification index of the acquisition sequence varying from 0 to $N_P-1$; and the cardinal $N_U$ of the plurality (8) of user terminals is equal to the maximum number of user terminals using only detections based on the acquisition sequences, according to the relationship:

$$N_U = N_S * (N_S - 1)/2$$

the sixth step comprises a fourth set of substeps consisting in: selecting arbitrarily or according to a preset criterion a reference time slot in the frame being processed from time slots for which an unresolved packet conflict has been detected; then choosing arbitrarily or according to a preset criterion in the selected reference time slot a detected acquisition sequence chosen from one or more acquisition sequences detected in said reference time slot; then determining the positions in the frame being processed of the possible replicas of a given packet associated with the detected and chosen acquisition sequence on the basis of all the positions of the times slots of the frame in which the detected and chosen acquisition sequence has been detected by short correlation and on the basis of the graph $\{u; F_{SMART}(u)\}$; then among the time slots of the possible replicas of a given packet having the same chosen detected acquisition sequence, identifying a time slot having only a single replica associated with the chosen acquisition sequence, the associated terminal and the other associated replicas corresponding to the same packet using the graph $\{u; F_{SMART}(u)\}$; then in a combining substep, computing the sum of the baseband signals of the replicas of the identified user terminal the packet to be decoded of which uses the chosen detected acquisition sequence; then demodulating and decoding the computed sum when the sum has a noise level located below a set noise threshold; then subtracting in baseband the demodulated and decoded signal of the replicas from the sum of the signal being processed in the time slots respectively associated with the replicas of the sum;

the one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which a correlation peak has a value higher than or equal to a preset first short-correlation threshold, or the one or more detected acquisition sequences are determined by computing a plurality of values of peaks in short correlations in baseband between the reference patterns of the possible acquisition sequences expected in the reference time slot and the signals contained in time slots for which the use of the reference patterns expected in the reference time slot is possible by virtue of the graph $\{u; F_{SMART}(U)\}$, and by selecting, as detected acquisition sequences, the acquisition sequences for each of which the sum of the squares of the moduli of the correlation values corresponding to a given reference pattern has a value higher than or equal to a preset second short-correlation threshold;

the detection by short correlation of the one or more acquisition sequences in the reference time slot is performed during the conventional decoding process of the CRD-SA protocol, a little before it fails and is suspended, or in an intermediate substep of detecting by short correlation, which substep is interposed between the substeps of selecting a reference time slot and of choosing a chosen detected acquisition sequence in the selected reference time slot; and the detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between the substeps of selecting a reference time slot and of choosing a chosen detected acquisition sequence in the selected reference time slot;

the sixth step furthermore comprises a substep of estimating frequency, delay, phase and amplitude parameters of each located replica, serving to compute the sum signal in baseband, the estimating substep being executed after the substep of identifying a time slot having only a single replica associated with the chosen acquisition sequence.

Another subject of the invention is a communication system for transmitting data packets through a random-access (RA) transmission channel shared by a plurality of user terminals, transmitting data packets through a random-access (RA) transmission channel shared by a plurality of terminals comprising: a receiving station; and a plurality of at least two user terminals that are actively connected to the receiving station, and a random-access (RA) transmission channel for transmission from the plurality of user terminals to the receiving station, using a time-diverse random-access protocol with resolution of inter-packet conflict.

The communication system being characterized in that:

the receiving station is configured to determine and/or store, in a preliminary first step, a function F for assigning and distributing transmission resources F(u) shared by the plurality of user terminals u connected to the receiving station, which function is defined by a graph $\{(u, F(u)\}$, in which u designates an identification and turn index of the user terminals of the plurality and the transmission resource F(u) associated with a user terminal u includes temporal positions of an integer number $N_R$, higher than or equal to 2, of replicas of a packet to be sent by the terminal u, selected from the ranks of time slots of a send time frame, and an acquisition sequence to be inserted in each of the $N_R$ replicas, selected from a family of quasi-orthogonal pseudo-random sequences; and each connected user terminal u is configured, in a first step, to receive or generate the associated component of the graph {(u, F(u)}; then, in a second step, to randomly generate $N_R$ replicas of a packet to be transmitted in the time slots of the send frame having the temporal positions assigned by the graph component of said terminal and in which is inserted the acquisition binary sequence assigned by the graph component of said terminal; and the receiving station is configured, in a third step of decoding received packets, to exploit the graph {(u, F(u)} of the assigning and distributing function to combine signals having the same acquisition signal in the $N_R$ possible positions of replicas of a given packet, in order to minimize, or even decrease to zero, the number of correlations in replica location that are required, between complex baseband data signals of different time slots, during the resolution of inter-packet interference conflicts that are not resolvable using the conventional decoding process of the time-diverse random-access protocol with resolution of inter-packet conflict.

According to particular embodiments, the communication system comprises one or more of the following features, alone or in combination:

the function F, designated by $F_{PSR}$ according to a first embodiment, is a pseudo-random deterministic function for assigning and distributing position vectors of the $N_R$ replicas of the packets within the time frame and of the acquisition sequences associated with the packets and each of the replicas thereof that depend on the user terminals of the plurality (8) via an input seed of the function $F_{PSR}$ which depends in a representative way on the identifier of each terminal, the distribution of the vectors of the positions of the $N_R$ replicas and of the acquisition sequences of the distributing function $F_{PSR}$ having a distribution profile that is substantially uniform over the set of all the possible vectors of positions of $N_R$ replicas and of all the possible acquisition sequences when the number of user terminals is sufficiently high;

the function F for assigning and distributing resources, which is designated by $F_{SMART}$ according to a second embodiment, is a "smart" deterministic function for assigning and distributing position vectors of the $N_R$ replicas within each frame among the set of all the possible vectors of positions of $N_R$ replicas in all of the time slots of the frame and of the acquisition sequences associated with the various sent replicas among all the possible acquisition sequences, determined so as to minimize, or even decrease to zero, the number of possible data loops in which the connected user terminals of the plurality use the same replica positions.

BRIEF DESCRIPTION OF THE DRAWINGS

The invention will be better understood upon reading the following description of several embodiments, this description being given solely by way of example and with reference to the drawings, in which:

FIGS. 9A, 9B and 9C are illustrations of an example of construction of respective groups of user terminals using a first, second, and third cyclic-shift level, and of the correspondence, for said user terminals, in transmission resources in terms of acquisition sequences, and of the positions of the first and second replicas of the associated packets, said packets being assigned according to construction rules of a graph of a second embodiment of an assigning function ($F_{SMART}$), which rules avoid data loops between user terminals, in which loops two or more terminals use the same replica positions;

FIGS. 10A, 10B, 10C, and 10 D are illustrations showing the capacity to looplessly decode data packets transmitted by user terminals, when said packets are grouped into groups $G_{i,j}$ as illustrated in FIGS. 9A, 9B and 9C and using the corresponding resource-distributing function $F_{SMART}$;

FIG. 11 is a flowchart of the step of processing and decoding packets of a time frame that have collided, said processing step being carried out after the decoding algorithm of the conventional CRD-SA protocol has failed or fallen over and corresponding to the second embodiment of the distribution function $F_{SMART}$, an example of which embodiment is illustrated in FIGS. 9A, 9B and 9C.

DETAILED DESCRIPTION

Generally, the principle of the invention is based on sharing, beforehand, by connected user terminals and by the receiving station, of knowledge regarding, for each packet potentially transmitted in the received time frame, the positions of the replicas of the packet in the frame and of the acquisition sequence inserted in the replicas of said packet, and based on the way in which the replicas and the acquisition sequences of the packets potentially transmitted by the connected user terminals are distributed, so that location of said replicas requires, on reception, a processing complexity that is lower in terms of the decrease, even potentially the decrease to zero, in the number of inter-slot replica-location correlations required, when conflicts in collisions between packets, which cannot be resolved via the use of the conventional CRD-SA protocol, occur.

Figure 1:
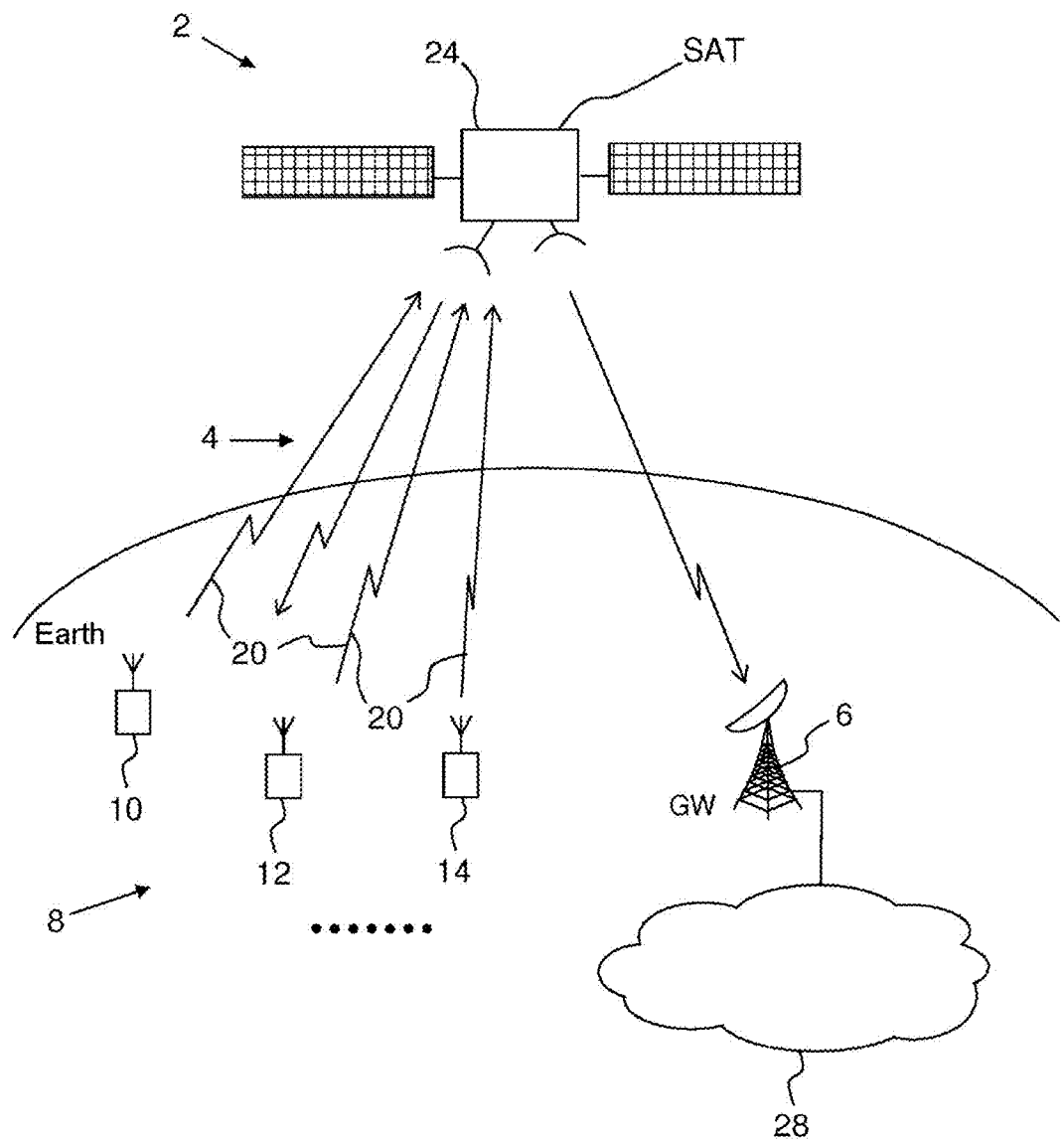
FIG. 1 is a view of an example, according to the invention, of a system for transmitting data packets through a random-access (RA) transmission channel shared by a plurality of terminals, here a space system with an RA return transmission channel.

In FIG. 1, schematically and according to the invention, a communication system 2 for transmitting data packets through a random-access (RA) transmission channel shared by a plurality of terminals, comprises a receiving station 6, a plurality 8 of an integer number $N_U$, higher than or equal to 2, of user terminals 10, 12, 14 that are actively connected to the receiving station 6, and an RA transmission channel 4 for transmission from the plurality 8 of user terminals 10, 12, 14 to the receiving station 6.

Here, preferably, the RA transmission channel 4 uses a time-diverse synchronous time-division ALOHA protocol with resolution of inter-packet conflicts called CRD-SA.

As a variant, the RA transmission channel could use a time-diverse asynchronous RA protocol with resolution of inter-packet conflicts called ACRDA.

Here, to increase the legibility of FIG. 1, only three terminals 10, 12 and 14 have been illustrated. Each connected user terminal 10, 12 and 14 of the plurality 8 is able to establish a two-way wireless link with the receiving station 6 (such as a gateway GW) via a satellite 24 SAT, said gateway 6 GW being connected to a terrestrial network 28, the Internet for example. The user terminals 10, 12, 14 are for example "domestic" terminals which each serve only one user. For example, it may be a question of small terminals, each belonging to one particular dwelling, used to provide a connection to the Internet 28 and/or to a digital television service with a return channel.

Here, the user terminals 10, 12, 14 use the uplink 20 as a return RA communication channel 4, of which there is assumed to be only one here, to sporadically transmit small data packets (sporadic traffic profile).

The random-access mode of the terminals associated with a given gateway is assumed here to be synchronous and uses a random-access method of the CRD-SA type. In the synchronous access mode, the transmissions generated by the subscribers of a given gateway are transmitted in frames divided into $N_S$ time slots. Each user will send an integer number $N_R$, higher than or equal to 2, of times the same packet in a frame in the form of $N_R$ replicas in $N_R$ different time slots, and must wait for the next frame to transmit another packet. The users are synchronized with one another and receive, as things progress, synchronization tables.

Generally, the receiving station 6 is configured to determine and/or store, in a preliminary first step, a function F for assigning and distributing transmission resources F(u) that are shared by the plurality 8 of terminals u connected to the receiving station in the communication system 2.

The assigning and distributing function F is characterized by a graph {(u, F(u)}, u designating each of the connected terminals 10, 12, 14 of the plurality 8 in turn, the graph being determined directly, for example using a table or indirectly using an algorithm. Each connected user terminal u of the plurality 8 is assigned a determined transmission resource F(u) including respective temporal positions of the $N_R$ replicas of a packet to be sent by the terminal 10, 12, 14, selected from the ranks of time slots of a given time frame, and an identifier of a binary acquisition sequence to be inserted in the $N_R$ replicas of the packet, selected from a family of quasi-orthogonal pseudo-random sequences.

Each connected user terminal u, 10, 12, 14, of the plurality 8, is configured, in the same preliminary first step, to receive or generate, when it has connected to the receiving station 6, the associated component of the graph {(u, F(u)}, then, in a second step, to generate and send $N_R$ replicas of a packet to be transmitted in the time slots of a transmission frame having the temporal positions assigned by the graph component of said terminal and in which time slots is inserted the acquisition sequence of said terminal, the received time frame corresponding to a synchronous reception mode.

The receiving station 6 is configured to exploit, during the decoding of the packets, the graph {(u, F(u)} of the function F to combine signals having the same acquisition signal in the $N_R$ possible positions of replicas of a given packet, in order to minimize the number of correlations that are required, between complex baseband data signals of different time slots, during the resolution of inter-packet interference conflicts that are not resolvable using the conventional decoding process of the CRD-SA protocol.

As a variant, the receiving station is configured to exploit, during the decoding of the packets, the graph {(u, F(u)} of the function F to combine signals having the same acquisition signal in the $N_R$ possible positions of replicas of a given packet, in order to minimize the number of correlations that are required, between complex baseband data signals of different time slots, during the resolution of inter-packet interference conflicts that are not resolvable using the conventional decoding process of the ACRDA protocol.

Figure 2:
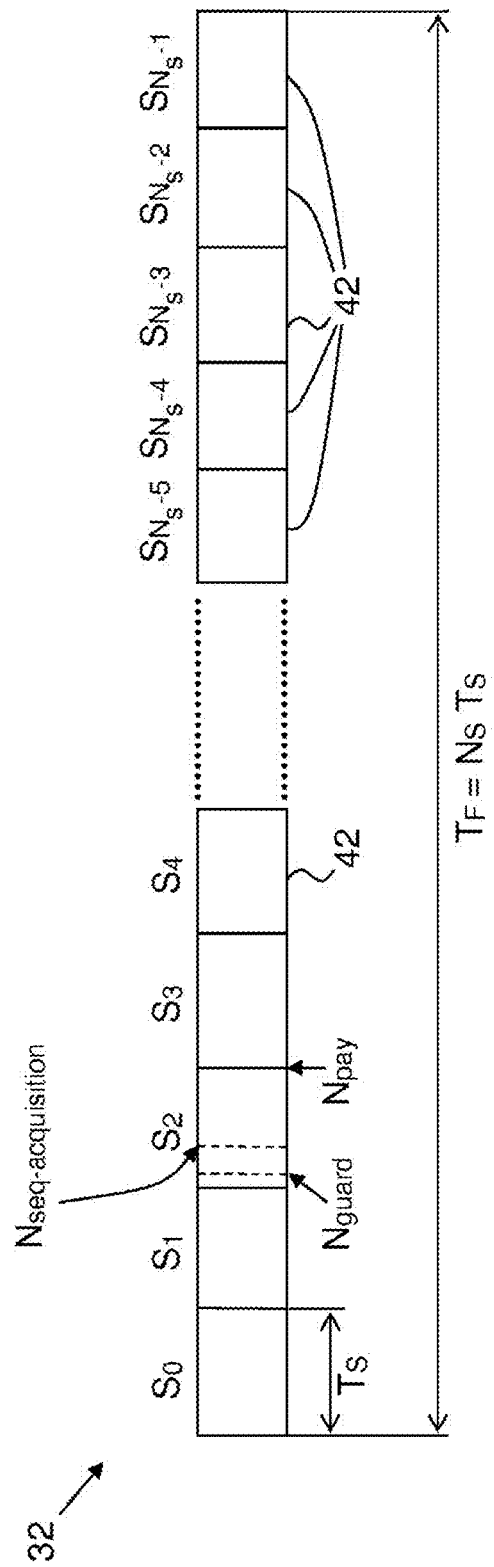
FIG. 2 is a view of the general structure of a CRD-SA time frame used by the conventional CRD-SA transmission protocol and by the transmitting system and method according to the invention.

In FIG. 2, a CRD-SA frame 32, designated by Fr, is typically composed of $N_S$ time slots 42 or successive time segments of a duration $T_S$, these slots or segments being identified, in the frame, by an integer position index that varies sequentially from 0 to $N_S-1$.

Each of these time slots 42 comprises a fixed integer number $N_{sym}$ of symbols, which are broken up as follows:

$N_{guard}$ guard symbols intended to prevent the loss of information in the event of imperfect synchronization between the various users, $N_{pay}$ payload symbols, $N_{seq-acquisition}$ acquisition-sequence symbols (or simply "preamble" symbols when the acquisition sequence is located before the payload).

Each symbol has a duration $T_{sym}$.

It follows that $T_S = N_{sym} * T_{sym}$

A code redundancy check (CRC) or a forward-error-correction (FEC) code makes it possible to verify that the payload has actually been decoded without errors.

Preferably, the acquisition sequence is an acquisition preamble located before the payload of the replicas of a packet.

The acquisition preamble, which is the same for the $N_R$ replicas of each packet, consists of a pseudo-random binary sequence of length Mpre-a, randomly chosen from an SPR family of sequences the size (number of sequences) of which is of the order of Mpre-a. The SPR family must exhibit good cross-autocorrelation properties, i.e. the sequences must be almost orthogonal to one another and exhibit a narrow autocorrelation peak. For example, Gold codes and the extended-length Gold codes are suitable families.

The sent packets may use the same acquisition preamble or different acquisition preambles.

An acquisition preamble makes it possible, in a conventional manner, to identify the start of each packet and possibly to estimate the phase, the delay and the frequency shift of the carrier ("channel estimation"), which estimation is used in the demodulation of the payload.

Figure 3:
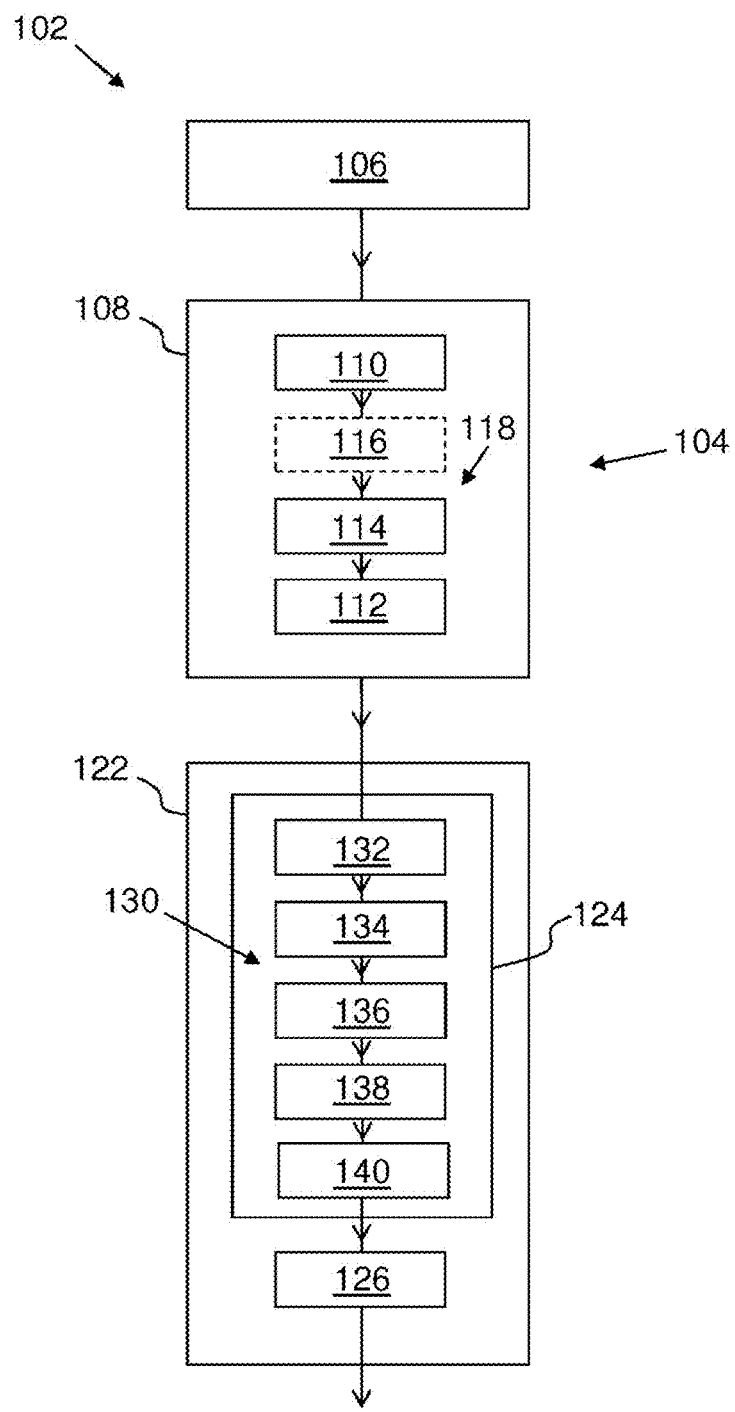
FIG. 3 is a general flowchart of a method according to the invention for transmitting data packets through an RA return transmission channel shared by a plurality of user terminals, which method is especially implemented by the communication system of FIG. 1.

In FIG. 3, a method 102 according to the invention for transmitting data packets through an RA return transmission channel shared by a plurality of terminals is for example implemented by the communication system 2 of FIG. 1.

The transmitting method 102 includes a first set 104 of steps.

In a preliminary first step 106, a function F for assigning and distributing resources F(u) to the plurality 8 of terminals (each identified by an integer index u) that are connected to the receiving station 6, is determined by one or more electronic computers. The assigning function F is defined by a graph {(u, F(u)}, u being an identification index designating each of the terminals of the plurality 8 in turn, and with each user terminal u is associated a transmission resource F(u) including respective temporal positions of an integer number $N_R$, higher than or equal to 2, of replicas of a packet to be sent by the terminal, selected from the ranks of time slots of a given send time frame, and an identifier of a binary acquisition sequence to be inserted in the $N_R$ replicas of the packet, selected from a family of quasi-orthogonal pseudo-random sequences.

Next, in the same first step 106, to each terminal of the plurality 8 connected to the receiving station 6 is delivered the associated component of the graph {(u, F(u)} whereas the entirety of the graph is made available and delivered to the receiving station.

The entire graph {(u, F(u)} may be delivered to the receiving station in various ways. For example, an electronic computer forming part of the receiving station is configured to compute and determine the graph of the function F. As a variant, the graph of the function F may be determined by computation by an electronic computer that is remote from the receiving station 6 and transmitted to the receiving station 6 in the form of a table, said table being stored on board the receiving station.

The graph component F(u) of each user terminal u may be delivered thereto in various ways. For example, an electronic computer forming part of the terminal is configured to compute and determine the graph component F(u) using an algorithm that defines the image of u via the function F. As a variant, the graph component F(u) respectively associated with each user terminal may be transmitted by the receiving station 6, which will then already know this component F(u).

Next, in a second step 108, each user terminal u generates, in a first substep 110, $N_R$ replicas of a packet to be transmitted in the time slots of a transmission frame having the temporal positions assigned by the graph component F(u) of said terminal, and, in a second substep 112, inserts, in said $N_R$ replicas, the binary acquisition sequence that is assigned thereto by the graph component F(u) of said terminal, the transmission frame preferably being synchronous but possibly, as a variant, being asynchronous.

The transmitting method 102 according to the invention is characterized in that the assigning and distributing function F, and therefore its graph {(u, F(u)}, are chosen so as to minimize, or even to decrease to zero, the number of loops between the connected user terminals of the plurality, in each of which loops at least two connected terminals of the plurality use the same $N_R$ replica positions independently of their order and the same acquisition sequence.

The family of quasi-orthogonal pseudo-random binary sequences is chosen from the codes used by code-division multiple-access systems, such as Gold codes and extended-length Gold codes. The binary acquisition sequence inserted into each replica may be a preamble, placed before the payload, and each transmitted replica may include one or more guard symbols defining a guard interval.

The second step 108 also comprises a third substep 114 of coding the replicas with a code redundancy check (CRC) and/or a forward-error-correction (FEC) code, said coding third substep 114 being performed before the insertion 112 of an acquisition binary sequence.

The second step 108 comprises an optional fourth substep 116 for inserting signaling information regarding the relative positioning of the replicas of a given packet, this substep being executed before the third substep of coding the $N_R$ replicas.

The first, second, third and fourth substeps 110, 112, 114, 116 form a first set 118 of substeps.

The transmitting method 102 according to the invention is characterized in that the assigning and distributing function F is chosen so that the exploitation of its graph {(u, F(u)} by the receiving station 6 allows, in a third step 122 of decoding the replicas, the number of inter-slot replica-location correlations required to locate the replicas of a packet, when said replica-location correlations, which are performed in base-band, are required to combine the replicas and decode the packet, when the conventional CRD-SA protocol decoding process has failed, to be minimized, or even decreased to zero.

Figure 4:
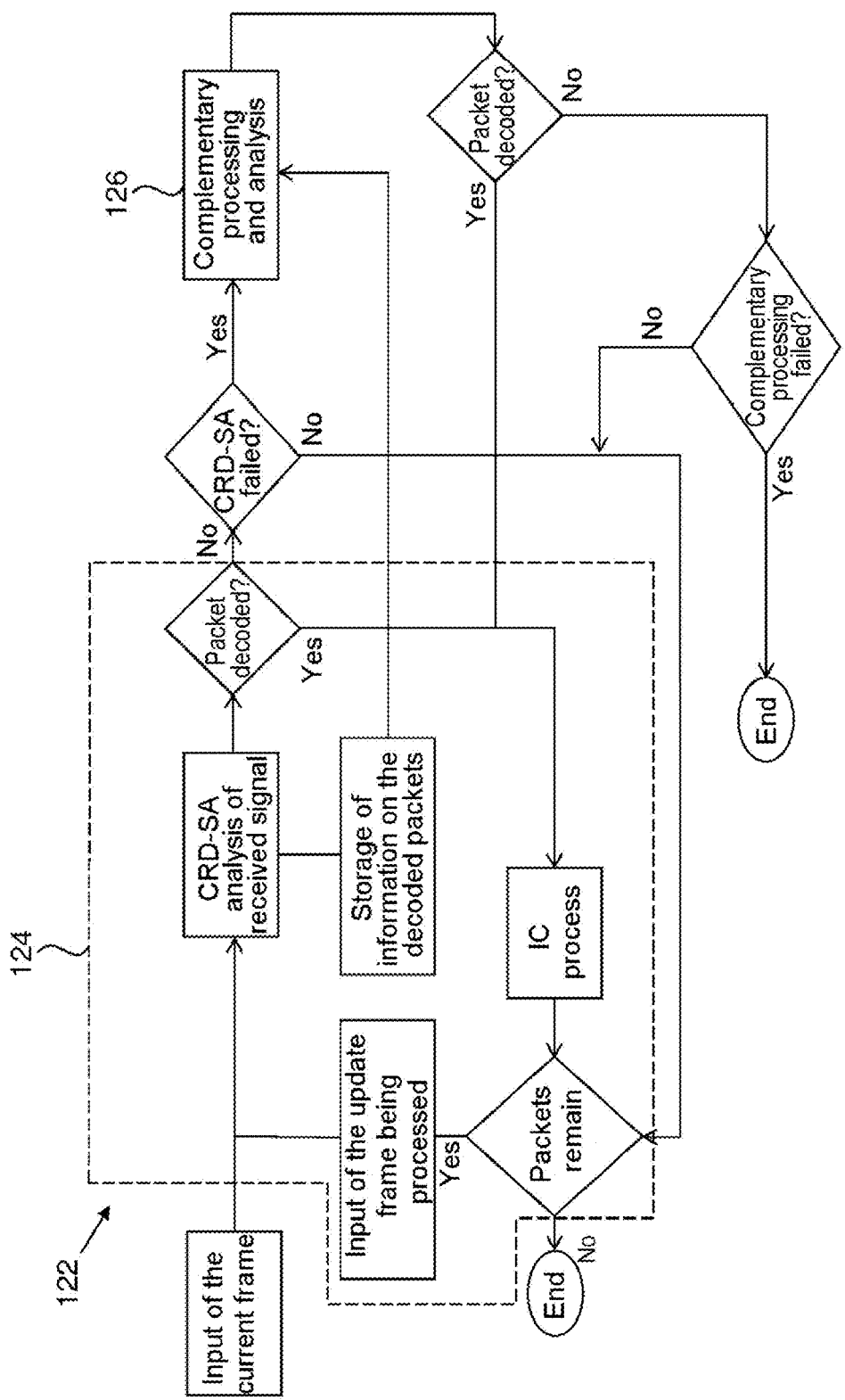
FIG. 4 is a detailed flowchart of the receiving and decoding step of the general transmitting method, according to the invention, illustrated in FIG. 3.

In FIGS. 3 and 4, the decoding third step 122 of the transmitting method 102 according to the invention furthermore comprises a fourth step 124 of collecting and decoding packets using a CRD-SA decoding protocol, said fourth step 124 being executed, reception-end, for each frame received after the first and second steps 106, 108.

As a variant, the third step 122 comprises a fifth step of collecting and decoding packets using an ACRDA decoding protocol, said fifth step being executed, reception-end, after the first and second steps 106, 108 in a moving window encompassing a certain number of virtual frames specific to the users.

In FIGS. 3 and 4, the decoding third step 122 of the transmitting method according to the invention comprises a sixth step 126 of complementary analyzing and processing to decode packets that are affected by interference and that have not been resolved by the fourth step 124 or the fifth step. The sixth step 126 is therefore triggered when there is at least one packet of the frame being processed that has been affected by interference and that has not been resolved during the execution of the fourth step 124 or the fifth step.

In FIG. 3, the fourth step 124 of collecting and decoding using a CRD-SA protocol comprises a second set 130 of substeps consisting in:

in a first substep 132, identifying, inside a received signal, replicas that have not been affected by destructive collisions with replicas of other packets; then in a second substep 134, extracting the information contained in the identified replicas; then in a third substep 136, temporally locating the one or more other replicas of the same packet using the information on the temporal positions of the replicas delivered by the components of the graph {(u, R(u)} and/or information signaling relative positioning, which information is extracted from the identified replicas when such replicas exist; then in a fourth step 138, erasing, in complex baseband, said one or more other replicas using an interference erasing algorithm, when it or they are affected by destructive collisions with replicas of other packets; then in a fifth substep 140, identifying other packets that, after said erasing substep, are no longer affected by destructive collisions and extracting the information that is contained therein.

In FIGS. 3 and 4, the first, second, third, fourth and fifth substeps 132, 134, 136, 138, 140 are repeated until all the packets in the processed frame have been decoded or decoding using the CRD-SA protocol fails.

The method 102 for transmitting data packets according to the invention, which has been dubbed SPoTIT (acronym of Shared Position Technique for Interfered random Transmissions), is therefore based on the principle of sharing knowledge on the positions of the replicas and the acquisition preambles of each subscriber or user terminal connected to the receiving station 6.

According to a first particular embodiment of the transmitting method 102 according to the invention, this embodiment being designated "random" SPoTIT, and corresponding to a first embodiment of the function F, designated $F_{PSR}$, the function $F_{PSR}$ is a pseudo-random deterministic function for distributing the possible vectors of positions of $N_R$ replicas in terms of rank of the time slots used with the frame and of the acquisition sequences associated with the various sent replicas of the packets, which depend on the user terminals of the plurality via an input seed Gr(u) of the function $F_{PSR}$, which in turn depends in a representative way on the identifier u of each terminal, the distribution of the vectors of positions of $N_R$ replicas and of the acquisition sequences of the distributing function $F_{PSR}$ having a distribution profile that is substantially uniform over the set of all the possible vectors of positions of $N_R$ replicas and of all the possible acquisition sequences when the number of user terminals is sufficiently high.

A vector of positions of $N_R$ replicas within the $N_S$ time slots is a Boolean vector with $N_S$ ordered components corresponding to the time slots ordered in the sequence S0, S1, S2, . . . , $S_N$, a component being set to 1 when the time slot is used or occupied by one of the $N_R$ replicas of a packet and to 0 otherwise. The possible vectors of $N_R$ replicas within the $N_S$ time slots are all vectors containing $N_S$ components having $N_R$ components set to 1, the $N_S$-$N_R$ components remaining set to 0.

The function $F_{PSR}$ is for example implemented using one or more pseudo-random (PSR) generators having as seed identification information known by the sender and the receiver.

Figure 5A:
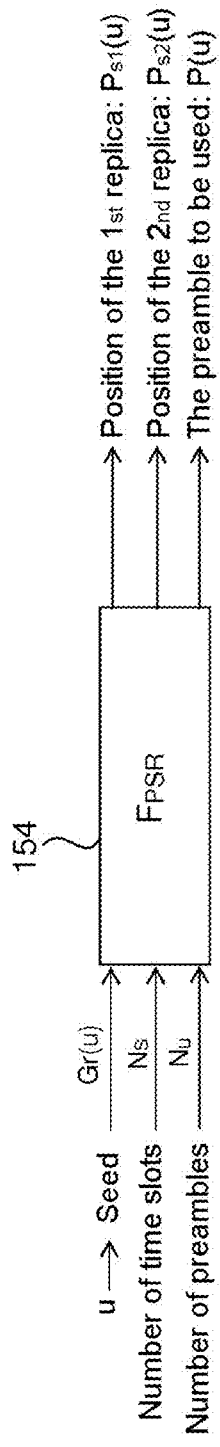
FIGS. 5A and 5B are respective views of the send- and receive-end means for sharing knowledge of the graph {u, $F_{PSR}$(u)} of a first embodiment of the function for distributing resources, which function is denoted $F_{PSR}$, of a first particular embodiment of the transmitting method, according to the invention, of FIG. 2.
Figure 5B:
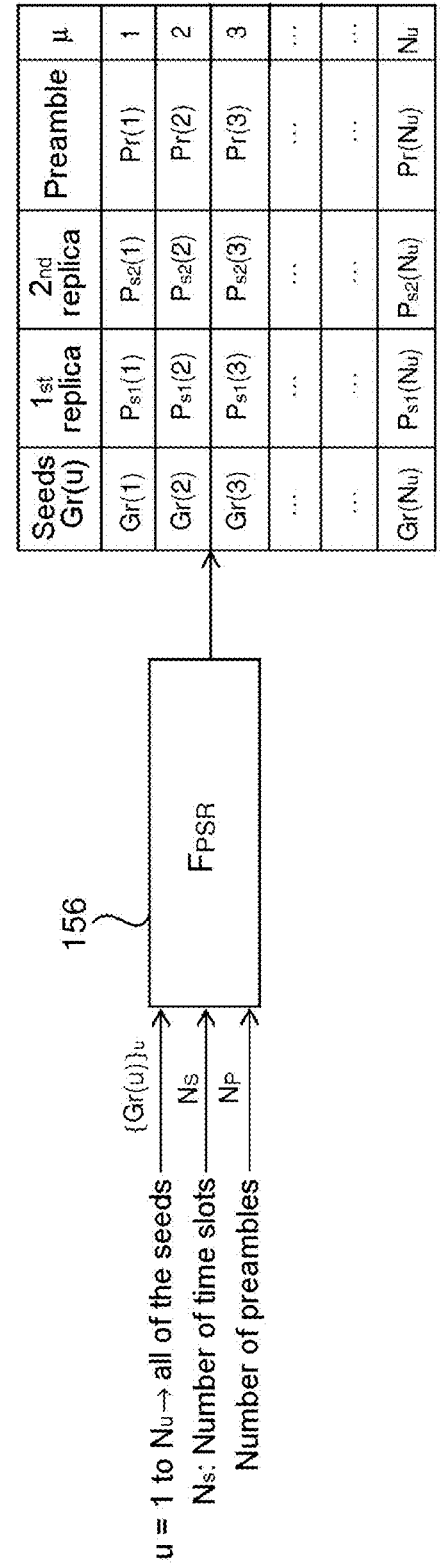

In FIGS. 5A and 5B, and according to one example of implementation of the function $F_{PSR}$ send-end and receive-end in the particular case where the number $N_R$ of replicas per packet is equal to 2, a deterministic generator 154, 156, of given design and of given structure, which generates as output a vector $F_{PSR}$(u), formed by first and second positions Ps1(u), Ps2(u) in the frame, and an acquisition preamble P(u) dependent of the identification index u associated with the terminal, uses a single pseudo-random generator (not shown), which is supplied with a seed Gr(u) representative of the index u of the user terminal.

In FIG. 5A, each user terminal, send-end, may limit the use made of its generator 154 of output vectors to delivery of the output vector $F_{PSR}$(u) associated with its identification index u, i.e. to a single component of the graph {u, $F_{PSR}$(u)}.

In FIG. 5B, the receiving station, reception-end, exploits the whole of the graph {u, $F_{PSR}$(u)} generated by its generator 156 of output vectors, this graph being shown in the form of a table 108 in FIG. 5B.

In a first embodiment, for each user terminal u connected to the receiving station 6, the seed Gr(u) associated with the user terminal u does not change over time and represents the hardware identifier (HID) to which a function u(HID) has been applied, with GR(u)=Gr(u(HID))).

In certain cases failure occurs when a plurality of user terminals generate, in the same frame, replicas in the same positions, transmit their packets in the same time slots, and create an unresolvable loop of collisions. No data packet will then be able to be decoded, thus causing failure again and again and forever.

To remedy this failure, the communication system is configured to select timeslots dynamically, when the packets are sent, this being achieved by making the seed Gr(u) of the pseudo-random generator vary dynamically, for each terminal, between each frame.

In a second embodiment, for each terminal u connected to the receiving station 6, the seed Gr(u) associated with the user terminal u is dynamic and varies between each frame, this especially being achieved using an algorithm Gr(u (HID*FID) representative of the variations in the product HID*FID of the identifier HID of the terminal u and an identifier FID of the frame, the latter identifier being representative of the temporal rank of the frame in a sequential order of frame advance.

Another identifier known beforehand or any other dynamic combination may be envisioned.

This makes it possible to change the seed Gr(u) on each transmission for each terminal and thus to avoid a continuous loop of collisions in the event of successive transmissions.

In FIGS. 5A and 5B, the pseudo-random deterministic distributing function $F_{PSR}$ is parameterized by the total number $N_S$ of time slots of a frame and the total number $N_P$ of acquisition sequences.

Figure 6:
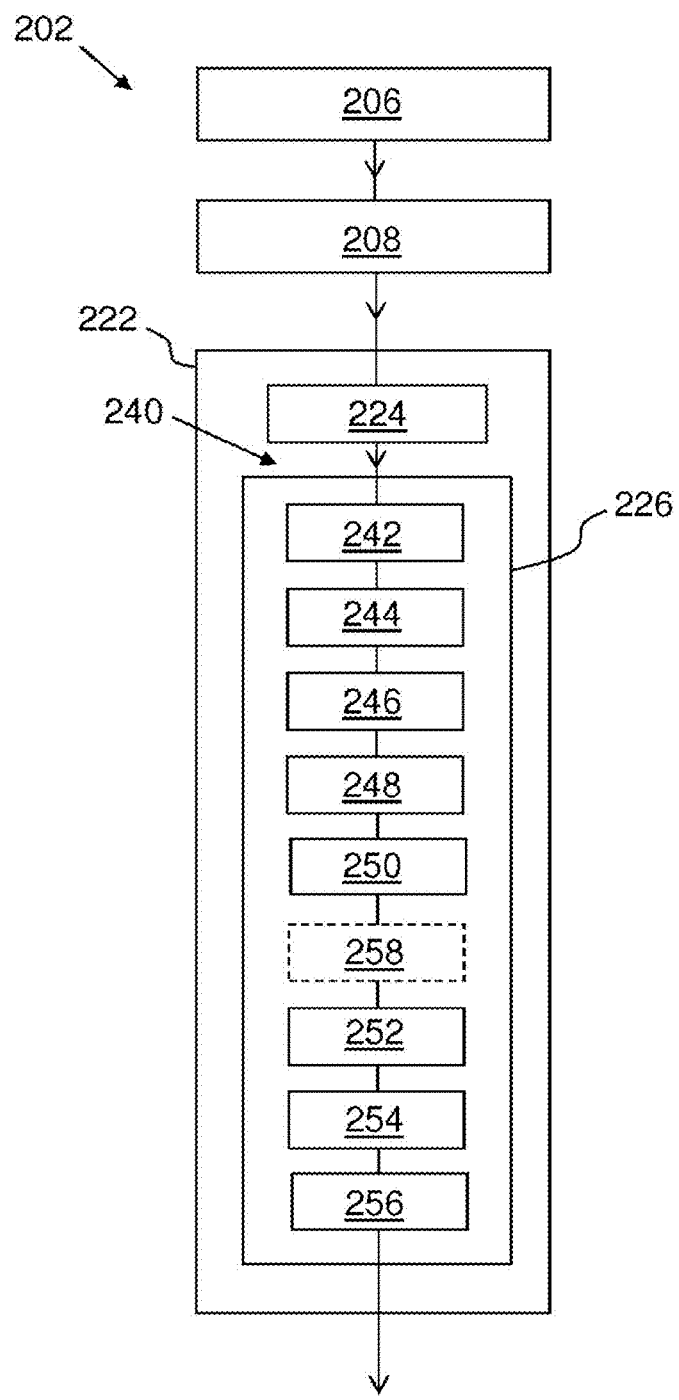
FIG. 6 is a flowchart of the step of processing and decoding packets of a time frame that have collided, said processing step being carried out after the decoding algorithm of the conventional CRD-SA protocol has failed or fallen over and corresponding to the first embodiment of the distribution function $F_{PSR}$, an example of which embodiment is illustrated in FIGS. 5A and 5B.

In FIG. 6, the "random SPoTIT" transmitting method, here designated by the number 202, comprises a first step 206 and a second step 208 by way of a particular embodiment of the first and second steps 106, 108 of FIG. 3, in the particular case where the distributing function F is equal to a pseudo-random deterministic distributing function $F_{PSR}$.

The "random SPoTIT" transmitting method 202 here comprises, just like the transmitting method 102 of FIG. 3, a first embodiment 222 of the third step 122 of FIG. 3, comprising a fourth step 224 of collecting and decoding packets using a CRD-SA decoding protocol, which is identical to the fourth step 124 of FIG. 1, and a first embodiment 226 of the sixth step 126 of FIG. 1, which comprises a third set 240 of substeps.

The sixth step 226 of complementary analyzing and processing is configured to decode packets affected by interference that are not resolved in the fourth step 224 and is triggered when at least one packet affected by interference of the frame is not resolved during the execution of the fourth step 224.

The substeps of the third subset 240 consist in:

in a first substep 242, selecting arbitrarily or according to a preset criterion a reference time slot in the frame being processed from time slots for which an unresolved packet conflict has been detected; then in a second substep 244, choosing arbitrarily or according to a preset criterion in the selected reference time slot a detected acquisition sequence chosen from one or more acquisition sequences detected in said reference time slot; then in a third substep 246, determining the positions in the frame being processed of the possible replicas of a given packet associated with the detected and chosen acquisition sequence on the basis of all the positions of the times slots of the frame in which the detected and chosen acquisition sequence has been detected by short correlation and on the basis of the graph $\{u; F_{PSR}(u)\}$; then in a fourth substep 248, computing the correlations in location of the replicas of the packet, between the baseband signal received in the reference time slot and the baseband signals of the time slots having the positions determined in the third substep 246; then in a fifth substep 250, selecting the time slots of the replicas of the packet of the reference time slot, the acquisition sequence of which was detected and chosen, to be the time slots having location-correlation values higher than a preset location-correlation value; then in a combining sixth substep 252, computing the sum of the baseband signals of the located replicas selected in the fifth step of the packet of the reference time slot, the acquisition sequence of which was detected and chosen; then in a seventh substep 254, demodulating and decoding the computed sum when the sum has a noise level located below a set noise threshold; then in an eighth substep 256, subtracting in baseband from the signal being processed the demodulated and decoded signal of the located replicas of the packet of the time slot associated with the chosen and detected acquisition sequence.

For example, a criterion of choice of the detected acquisition sequence may be based on a criterion of order of the signal-to-noise ratios of the detected acquisition sequences.

The one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which an acquisition peak has a value higher than or equal to a preset first short-correlation threshold.

The one or more detected acquisition sequences are determined by computing a plurality of values of short correlations in baseband between the reference patterns of the possible acquisition sequences expected in the reference time slot and the signals contained in time slots for which the use of the reference patterns expected in the reference time slot is possible by virtue of the graph $\{u; F_{PSR}(u)\}$, and by selecting, as detected acquisition sequences, the acquisition sequences for each of which the sum of the squares of the moduli of the correlation values corresponding to a given reference pattern have a value higher than or equal to a preset second short-correlation threshold.

The detection by short correlation of the one or more acquisition sequences in the reference time slot is performed during the conventional decoding process of the CRD-SA protocol, a little before it fails and is suspended, or in an intermediate substep of detecting by short correlation, which substep is interposed between the first substep 242 and the second substep 244 of the sixth step 226.

The detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between the second substep 244 and the third substep 246 of the sixth step 226.

It will be noted that the sixth step may also include a ninth substep 258 of estimating frequency, delay, phase and amplitude parameters of the channel on the basis of the location correlations of the replicas of the packet, the ninth substep being interposed between the fifth substep 250 and the combining sixth substep 252.

Thus, since the receiving station 6 knows the positions in which the replicas of the packet to be decoded of a reference time slot are located, it does not need to perform the location correlations over the entire time frame. Therefore, the number of location correlations will be reduced and limited to the number of potentially collided packets having the same preamble in the reference time slot being processed.

Figure 7A:
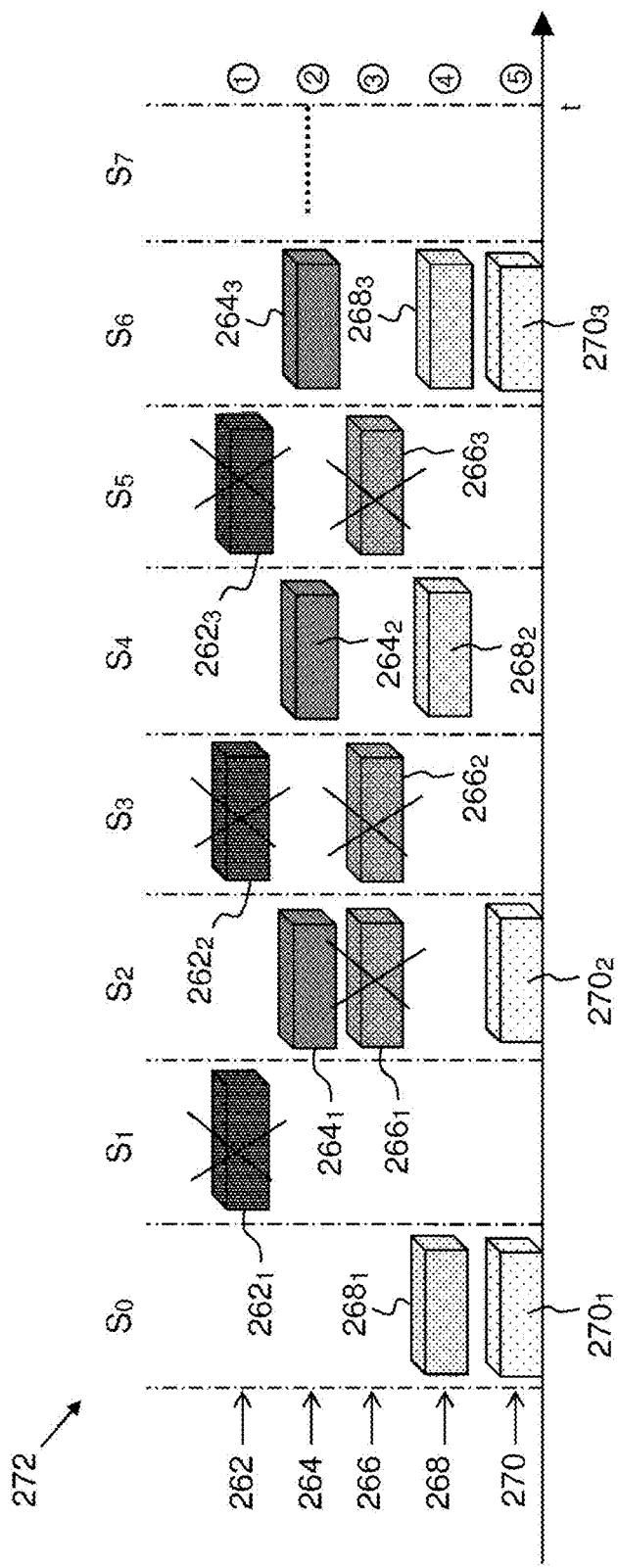
FIG. 7A is an example illustrating the implementation of the preliminary step of receiving and decoding data packets using the conventional decoding algorithm of the conventional CRD-SA protocol, up to the point of failure of said CRD-SA algorithm.
Figure 7B:
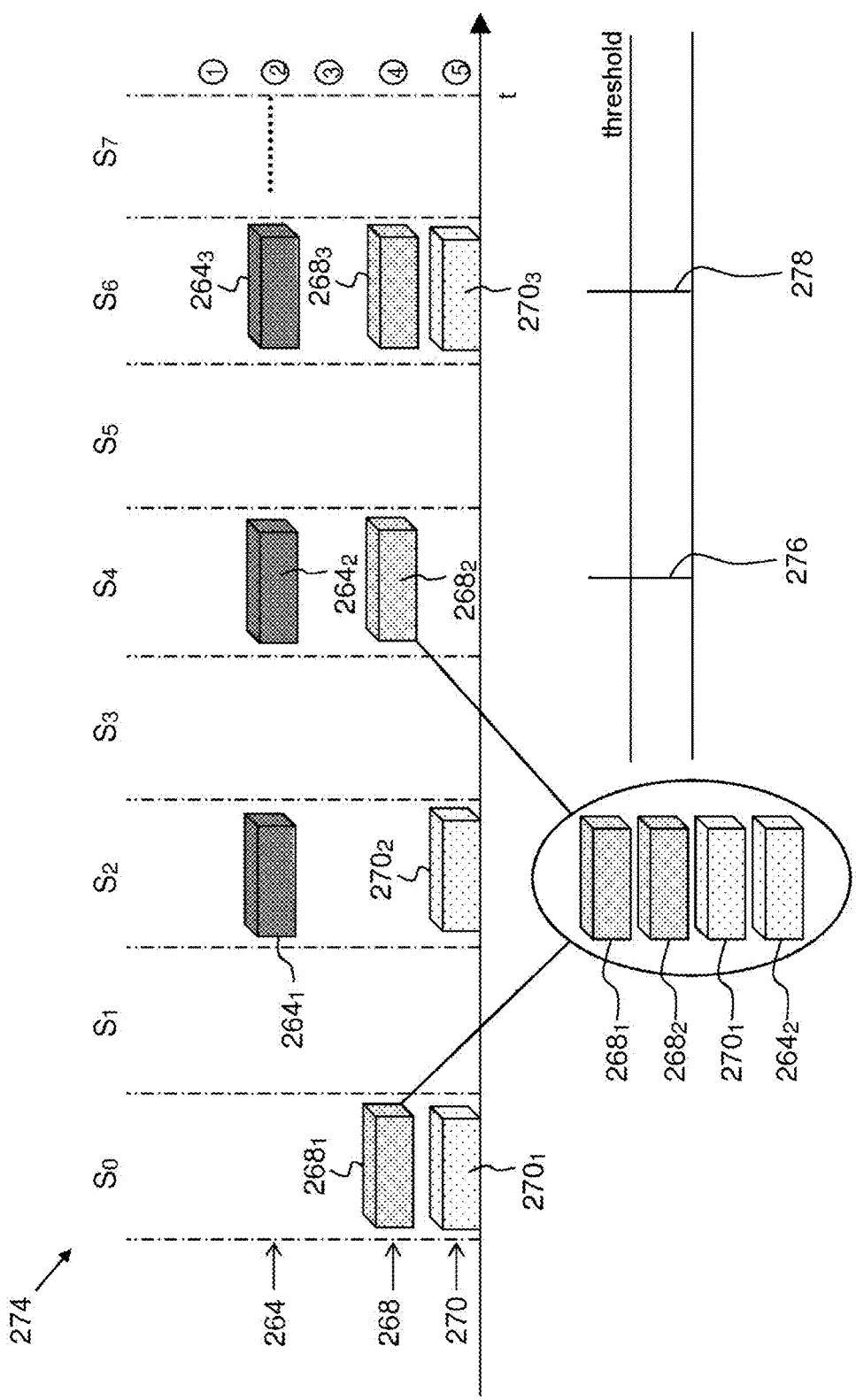
FIG. 7B is an example illustrating the implementation of the processing step of FIG. 6 corresponding to the "random" SPoTIT method, employing a low number, here two, of location correlations, and carried out after the prior step of conventional CRD-SA decoding illustrated in FIG. 7A has failed.

In FIGS. 7A and 7B, an example of processing of a particular frame for packet decoding is illustrated in the case where a "random" SPoTIT protocol is used.

In FIG. 7A, five different packets 262, 264, 266, 268, 270 are transmitted and received, here synchronously, in a reception frame 272 here comprising eight time slots ($N_S=8$) that follow each other in succession and are respectively designated by S0, S1, S2, S3, S4, S5, S6, S7.

Each packet (illustrated on a different line, numbered 1 to 5 starting from the top in each of FIGS. 7A and 7B and by a different hatch pattern to help distinguish between them) has a number $N_R$ of replicas equal to 3 and has a different preamble.

In FIG. 7A, the first packet 262 has three replicas $262_1$, $262_2$, $262_3$, which are arranged in the time slots S1, S3, S5, respectively, and which use the same first acquisition preamble.

The second packet 264 has three replicas $264_1$, $264_2$, $264_3$, which are arranged in the time slots S2, S4 and S6, respectively, and which use the same second acquisition preamble.

The third packet 266 has three replicas $266_1$, $266_2$, $266_3$, which are arranged in the time slots S2, S3 and S5, respectively, and which use the same third acquisition preamble.

The fourth packet 268 has three replicas $268_1$, $268_2$, $268_3$, which are arranged in the time slots S0, S4 and S6, respectively, and which use the same fourth acquisition preamble.

The fifth packet 270 has three replicas $270_1$, $270_2$, $270_3$, which are arranged in the time slots S0, S2 and S6, respectively, and which use the same fifth acquisition preamble.

The first, second, third, fourth and fifth differ from each other (i.e. when pairs are considered).

Following the step 224 of decoding using the CRD-SA protocol, time slot S1 is chosen to be the reference time slot and the first replica $262_1$ of the first packet 262 that it contains is identified as a clean replica. The first packet 262 is then decoded using this first replica and the positions of the second and third replicas of the first packet are determined. Next, the complex baseband signal of the first packet is removed by SIC from the signal received in the time slots S1, S3 and S5 and an updated received signal is obtained.

The CRD-SA decoding is reiterated with the time slot S3 chosen as the new reference time slot. The second replica $266_2$ of the third packet 266, which replica is contained in the new reference time slot S3, is identified as a clean replica. The third packet 266 is then decoded using this second replica and the positions of the first and third replicas of the third packet are determined. Next, the complex baseband signal of the third packet is removed by SIC from the signal received in the time slots S2, S3 and S5 and a new updated received signal 274 is obtained.

This new updated received signal 274 will serve as an input signal (in FIG. 7B) for the processing operations of step 226, which attempt to resolve inter-packet conflicts that cannot be resolved by the CRD-SA protocol and which are associated with the "random SPoTIT" protocol.

Specifically, it may be seen that the new updated received signal cannot be decoded by the conventional decoding technique of the CRD-SA protocol.

In FIG. 7B, the first substep 242 of the sixth step 226 being implemented, the time slot S0 is chosen as the reference time slot. The fourth and fifth preambles are detected in the reference time slot S0 by correlation with the possible preambles, and the fourth preamble is chosen arbitrarily.

Next, using knowledge of the graph $\{u, F_{PSR}(u)\}$, two inter-slot location correlations are performed, one between the complex baseband signal contained in the reference time slot S0 and the complex baseband signal contained in the time slot S4, the other between the baseband signal contained in the reference time slot S0 and the complex baseband signal contained in the time slot S6, this leading to a first location-correlation peak 276 and to a second location-correlation peak 278.

The first and second location-correlation peaks 276 and 278 allows the positions and reception quality of the second and third replicas $268_2$ and $268_3$ of the fourth packet 278 to be validated, when they each exceed a preset threshold value.

The first and second location correlation peaks 276 and 278 then allow frequency, delay, phase and amplitude parameters of each located replica that serve in the computation of the sum signal in baseband to be estimated.

The complex baseband signals contained in the time slots S0, S4 and S6 are combined and the computed sum of the first, second and third replicas $268_1$, $268_2$, $268_3$ of the fourth packet 268 is extracted, demodulated and decoded. Next, the complex baseband signal of the decoded fourth packet 268 is removed by SIC from the signal 274 received in the time slots S0, S4 and S6 and a new updated received signal is obtained.

The new updated received signal then allows the conventional decoding of the CRD-SA protocol to again be used and the fifth packet 270 and the second packet 264 to be successively decoded.

It will be noted that, as a variant, the fifth preamble could have been chosen from the reference time slot S0; this would then have led to the computation of two inter-slot location correlations for the second and third replicas $270_2$, $270_3$ of the fifth packet 270, one between the signal contained in the reference time slot S0 and the signal contained in the time slot S2, and the other between the signal contained in the reference time slot S0 and the signal contained in the time slot S6.

Figure 7C:
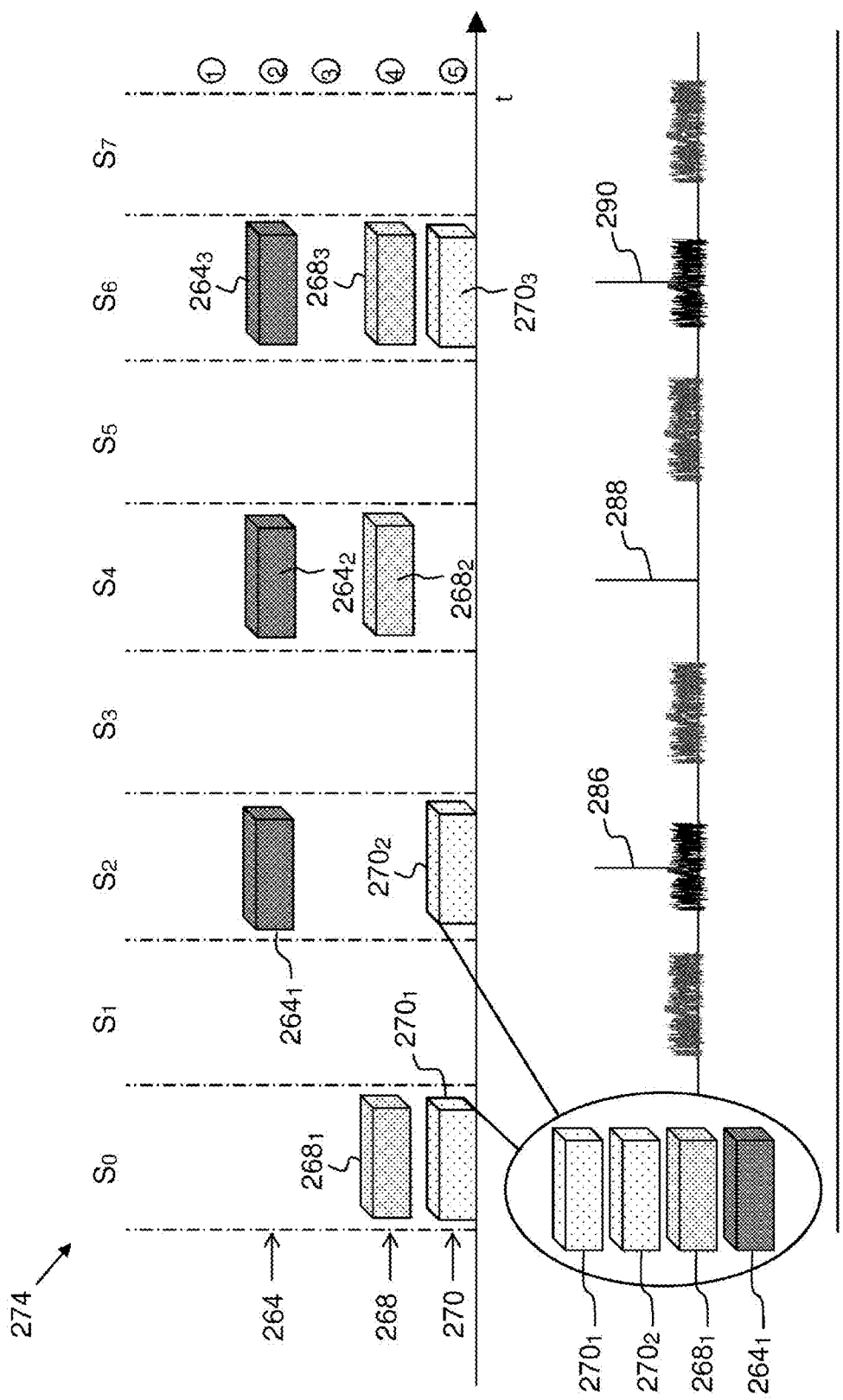
FIG. 7C is the illustration of the application of the decoding algorithm of the conventional MARSALA protocol following the prior step of conventional CRD-SA decoding of FIG. 7A, employing a number $N_S$–1 (here seven) of location correlations, this illustration being provided for comparison to that of the application of the "random" SPoTIT protocol decoding algorithm of FIG. 7B.

In FIG. 7C, and by way of comparison with the processing operations of the "random SPoTIT" protocol according to the invention of FIG. 7B, which operations are employed after conventional CRD-SA decoding has failed, the decoding processing operations of the MARSALA protocol are applied after conventional CRD-SA decoding has failed.

In the first-substep 142 of the sixth step 126, the time slot S0 is chosen to be the reference time slot. The fourth and fifth preambles are detected in the time slot S0 by correlation with all the possible preambles, and the fourth preamble is arbitrarily chosen, just like in the "random" SPoTIT method of FIG. 7B.

In the MARSALA processing, since the receiving station has no prior knowledge of the possible positions of the replicas of one or more packets having the same preamble, $N_S-1$ inter-time-slot location correlations will still need to be performed.

Here, the reference time slot in question being S0, seven replica-location correlations are computed between the complex baseband signal contained in the baseband time slot contained in the reference time slot S0 and each of the respective signals contained in the time slots S1, S2, S3, S4, S5, S6 and S7.

A first replica-location correlation is computed between the complex baseband signal contained in the reference time slot S0 and the complex baseband signal contained in the time slot S2, a second replica-location correlation is computed between the complex baseband signal contained in the reference time slot S0 and the complex baseband signal contained in the time slot S4, and a third replica-location correlation is computed between the baseband signal contained in the reference time slot S0 and the complex baseband signal contained in the time slot S6, leading to a first location-correlation peak 286, a second location-correlation peak 288, and a third correlation peak 290.

As regards the other correlations carried out, they lead to signals of noise-type amplitudes clearly lower than those of the location-correlation peaks 286, 288, 290.

The characteristics of the first, second and third correlation peaks are exploited to determine the one or more replicas of the fourth packet 268 that lend themselves best to combination. Here, the second correlation peak 288 is preferred as it has a higher signal-to-noise-plus-interference ratio than the signal-to-noise-plus-interference ratios of the first and third correlation peaks 286, 290.

The second location-correlation peak 288 then allows frequency, delay, phase and amplitude parameters of the located replica that serve in the computation of the sum signal in baseband to be estimated.

The complex baseband signals contained in the time slots S0 and S4 and S6 are then combined, just as in the "random SPoTIT" decoding method of FIG. 7B, and the computed sum of the first and second replicas $268_1$, $268_2$ of the fourth packet 268 is extracted, demodulated and decoded. Furthermore, the signaling data of the demodulated fourth packet 268 allows the position of the second replica $268_3$ of the fourth packet 268 to be determined.

Next, just as in the processing described with reference to FIG. 7B, the complex baseband signal of the decoded fourth packet 268 is removed by SIC from the signal 274 received in the time slots S0, S4 and S6 and a new updated received signal is obtained. The new updated received signal then allows the conventional decoding of the CRD-SA protocol to again be used and the fifth packet 270 and the second packet 264 to be successively decoded.

Reception-end, the location correlations will be decreased to the number of packets with the same preamble that are potentially present in the analyzed time slot. These location correlations are used to determine which among the potential packets were transmitted in the received frame.

This makes it possible to keep exactly the same performance levels as those obtained with the conventional MARSALA method, but considerably decreases the complexity of the method used, according to the invention, in terms of correlations, by decreasing the number of replica-location correlations required to decode a packet when the decoding of the CRD-SA protocol has failed.

With the "random" SPoTIT protocol, on reception of the frames, the receiving station computes all the potential positions of the packets of each connected subscriber by virtue of knowledge of the static or dynamic seed Gr(u) of the subscriber u and the algorithm of the distributing function $F_{PSR}$. Generally, for each time slot of the received synchronous frames or of the received asynchronous virtual frames, the receiving station knows all the potential user terminals that will possibly have sent packets. When the presence of a preamble in an analyzed reference time slot is detected by virtue of a correlation peak, it is only necessary, with the "random" SPoTIT protocol, to perform location correlations on time slots that are liable to actually contain a replica, the preamble of which is that detected in the reference time slot for which analysis is being carried out.

For example, in the case of a "random SPoTIT" transmitting method and system employing two replicas ($N_R=2$), if four potential packets of a given preamble are found in the same reference time slot, only four replica-location correlations will be performed, the replica-location correlations corresponding to the four time slots containing the second replicas of the four potentially collided packets, instead of a number of replica-location correlations equal to the total number of slots minus one, i.e. $N_S-1$, in the case of a transmitting method and system using the MARSALA protocol. For example, for a number of time slots per frame $N_S$ equal to 100, the number of replica-location correlations will be equal to 99.

Generally, when the decoding process of the CRD-SA protocol has failed and no packets can be decoded, the MARSALA decoding process will choose a reference time slot in order to perform the inter-time-slot location correlations required to locate the replicas of packets that have collided in this slot. In the case of decoding according to the MARSALA protocol with two replicas ($N_R=2$), the following relationship gives the dependency of this number $N_{corr\_loc}$ of location correlations on the number of time slots $N_S$:

$$Nb_{corr\_loc} = (N_S - 1).$$

In contrast, when the random-SPoTIT decoding process is used after failure of the CRD-SA protocol, the dependency of the number of replica-location correlations on the potential number of collided packets $N_{PKU}$ located in the reference time slot under analysis is given by the relationship:

$$Nb_{corr\_loc} = N_{PKU}$$

Figure 8:
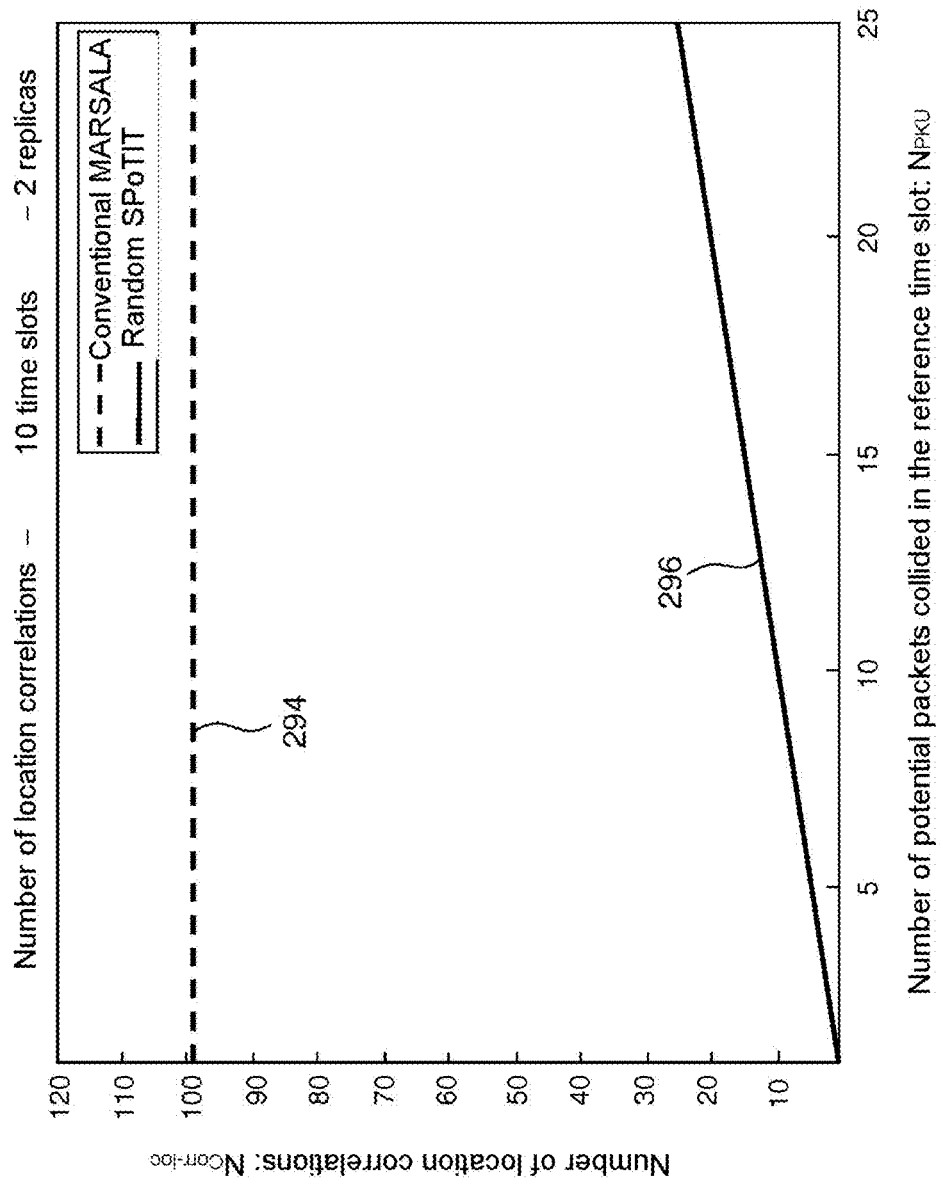
FIG. 8 is a comparative view of the variation in the number of location correlations as a function of the number of potential packets collided in the time frame between the case of the use of a MARSALA decoding algorithm and the case of a "random" SPoTIT decoding algorithm corresponding to the first embodiment of the transmitting method according to the invention.

In FIG. 8, for the sake of comparison, the variation in the number $Nb_{corr\_loc}$ of replica-location correlations as a function of the number $N_{PKU}$ of potential packets collided in the time slot, for decoding according to the MARSALA protocol and for decoding according to the random-SPoTIT protocol, has been illustrated via a first curve 294 of variation and a second curve 296 of variation, corresponding to the MARSALA protocol and to the "random"-SPoTIT protocol, respectively. In this comparison, the number $N_R$ of replicas of a packet and the number $N_S$ of time slots per frame are assumed to be equal to 2 and 100, respectively, independently of the protocol used.

It will be noted that the number of replica-location correlations may be decreased in decoding according to the "random"-SPoTIT protocol by increasing the number $N_P$ of acquisition preambles, this having the effect of decreasing the number of potential collided packets using the same preamble in the reference time slot $P_{PKU}$.

According to a second particular embodiment 302 of the transmitting method 102 according to the invention, designated "smart" SPoTIT, and corresponding to a second embodiment of the function F, designated $F_{SMART}$, the function $F_{SMART}$ is a "smart" deterministic function for assigning and distributing the position vectors, of the $N_R$ replicas within each frame, among the set of all the possible vectors of positions of $N_R$ replicas, in all of the time slots of the frame, and the acquisition sequences associated with the various sent replicas among all the possible acquisition sequences, the graph $\{(u, F_{SMART}(u)\}$ being determined so as to make correspond to each used acquisition sequence gj of the set of acquisition sequences $\{gj\}$, a set Tj of user terminals Ujk and a plurality of vectors Vjk (Pgj (1), ..., Pgj (R)) of positions of $N_R$ replicas that differ from each other by at least one position.

Direct control of the positions of the replicas and of the preambles, the latter being associated, in the frame, with user terminals, prevents the same preamble from being used in the same slot and eliminates data loops between users to a certain degree, a loop occurring when two user terminals or more use $N_R$ same time slots. This control allows, in addition to the decrease in processing complexity, performance in terms of packet loss rate (PLR) to be improved by eliminating the use of replica-location correlations. This is due to the disappearance of the error floor created by loops when the load on the network is low.

N.B., the number $N_R$ of replicas per packet is assumed to be equal to 2 below.

The assigning function $F_{SMART}$ is configured so as to avoid any possibility of a loop occurring and thus to avoid any need for replica-location correlation.

It is known that the number C1 of combinations of $N_R$ replica positions among $N_S$ time slots of a time frame is equal to:

$$C1 = \frac{N_S!}{(N_S - N_R)!}$$

By using a transmitting method 302, according to the invention, that avoids or eliminates potential loops, for which (p1=k, p2=m)=(p2=k, p1=m), p1 and p2 designating the respective positions of the first and second replicas of a packet, and being different from j, the number C2 of admissible combinations of $N_R$ replica positions among $N_S$ time slots of a time frame without loop is then equal to:

$$C2 = \frac{N_S!}{N_R * (N_S - N_R)!}$$

For example, when the number of time slots per frame is equal to 100, the number C2 is equal to 100*99/2, the number $N_R$ of replicas of a packet being assumed to be equal to 2.

It will be noted that, up to now, only the loops with respect to the choice of the time slots have been avoided.

In order to eliminate correlations related to the location of the replicas of a packet, acquisition preambles that form signals that are pseudo-orthogonal to one another are further employed. This has the effect of decreasing the number of possible combinations of pairs of positions of the replicas, i.e., thus, the possible number of user terminals or subscribers associated with a possible given type of reception.

The resource-assigning function $F_{SMART}$ is defined so that all potential collisions of packets in a given time slot can be discerned using, to this end, only the pseudo-orthogonal characteristic of the acquisition preambles. As is known, Gold codes allow the acquisition sequences or preambles used by the transmitting method 302 to be endowed with such a property of pseudo-orthogonality.

Given that it is the detection of a code of an acquisition sequence that is unique in a time slot that allows the use of baseband location correlations on the data of the replicas to be avoided, in order to be able to be identified, a code of an acquisition sequence will have to be used by a set of unique combinations of pairs in which no loops and no preamble repetitions feature.

Several methods or techniques allowing construction of a smart assigning function $F_{SMART}$ via which the pairs of time slots are chosen in a unique manner for a given acquisition preamble, may be used.

Here, and by way of example, a technique based on circular shifts regarding the choice of the position of the second replica of a given group of pairs of positions of replicas using the same preamble on transmission, is described. With this technique, only acquisition-preamble correlations will be exploited during decoding.

It is assumed here that the number of time slots per frame $N_S$ is an even number and that the number of acquisition preambles $N_P$ is equal to $N_S/2$.

A set of first-level groups $G_{1,j}$ of user terminals, j varying from 0 to $N_P-1$, is defined in the following way.

Each user Ujk within a given group $G_{1,j}$, k varying from $$0 \text{ to } \frac{N_S}{2} - 1,$$

uses the same preamble gj, which is characterized by the index j, the index j also designating the order of the circular shift carried out on the position of the second replica. Each user 'Ujk', k therefore sends its two packet replicas, the first replica and the second replica, in the time slots having the respective positions P1gj(k) and P2gj(k)z, each of the components (here two in number) of each of the pairs being different from those of the others, when said pairs are compared in twos.

Each first-level group $G_{1,j}$ of users Ujk, j being an integer index comprised in the interval:

$$\left[0, \frac{N_S}{2} - 1\right]$$

is characterized oy the datum of a set of triplets R(1,j,k) of resources each formed fork varying from $$0 \text{ to } \frac{N_S}{2} - 1:$$

the acquisition preamble gj of index j,
a first replica position P1gj(k), and
a second replica position P2gj(k),
the first and second positions being defined by the relationships:
P1gj(k)=k and $$P2gj(k) = \frac{N_S}{2} + ([j+k](\text{mod } N_P)),$$

the operator mod $N_P$ designating the arithmetic operator "modulo $N_P$".

{P1gj (k)}, k varying from $$0 \text{ to } \frac{N_S}{2} - 1,$$

is the set, associated with the acquisition preamble gj and with shift j, of the choices of the position of the first replica for each subscriber Ujk.

[{P2gj (k)}, k varying from $$0 \text{ to } \frac{N_S}{2} - 1,$$

is, correspondingly, the set, associated with the acquisition preamble gj and with shift j, of the choices of the position of the second replica for each subscriber Ujk.

As there are $N_P$ possible shifts, there are therefore $N_P$ groups $G_{1,j}$ of $N_P$ different acquisition preambles, each group $G_{1,j}$ containing $$\frac{N_S}{2}$$

of me user terminals that are connected to the receiving station. In total, all of the $N_P$ first-level groups $G_{1,j}$ contain $$\frac{N_S}{2} * N_P$$

subscribed user terminals.

It will be noted that some additional triplets could be used, such as for example the triplet $(g_0, 0, 1)$, which may be used in addition to the group $G_{1,0}$ associated with the preamble g0 and which may be decoded without resorting to replica-location correlations.

In order to exploit all the possible combinations of acquisition preamble, of first position and of second position, and to enrich the combinations offered by the first-level groups, groups $G_{i,j}$ of level i higher than the first level (i=1) may be created, the cardinal of a group $G_{i+1,j}$ of higher level i+1 associated with an acquisition preamble gj being equal to half of the cardinal $G_{i,j}$ of the corresponding group of lower level i. This allows a set of groups of subscribed user terminals forming a plurality of subscribers that share in equal numbers the $N_P$ acquisition preambles and that do not require any replica-location correlations to decode received packets to be obtained. In addition, the total number C3 of user terminals of this plurality is maximum and equal to:

$$\frac{N_S * (N_S - 1)}{2}.$$

This number C3 is equal and corresponds to the binomial coefficient $$\binom{N_S}{N_R}.$$

The subscribers of a given group $G_{i,j}$ of level i and of shift index j use the same preamble gj of index j.

Below, the number of time slots per frame $N_S$ is assumed to be a power of 2 and the number $N_P$ of acquisition preambles is assumed to be equal to the number $N_S$ of time slots per frame divided by 2.

Below, the integer number $N_L$ designates the total number of levels of the groups forming the plurality of the user terminals and is equal to the logarithm to base 2 of the number $N_S$ of time slots per frame, i.e.: $N_L = \log_2(N_S)$.

To each level i, i varying from 1 to $N_L$, corresponds a number $N_E(i)$, equal to $2^{i-1}$, of sets $E_{i,s}$ of time-slot indices, with s varying from 1 to $N_E(i)$.

Each set $E_{i,s}$, s being comprised between 1 and $N_E(i)$, comprises a number $N_{SS}(i)$, equal to $$\frac{N_S}{2^{i-1}},$$

of ordered time-slot indices.

The set $E_{i,s}$ is defined by the expression:

$E_{i,s} = \{B_{inf}(i,s), \ldots M(i,s) \ldots, B_{sup}(i,s)\}$ in which
$B_{inf}(i,s)$ is equal to $(s-1)*N_{SS}(i)$, and
$B_{sup}(i,s)$ is equal to $s*N_{SS}(i)-1$, and
$M(i,s)$ is equal to $$B_{inf}(i, s) + \frac{B_{sup}(i, s) + 1 - B_{inf}(i, s)}{2}.$$

To each set $E_{i,s}$ corresponds $N_{SS}(i)$ acquisition preambles gj with:

$$(s-1)*\left(\frac{N_S}{2^i}\right) \le j \le s*\left(\frac{N_S}{2^i}\right) - 1$$

and $$\frac{N_S}{2^i}$$

user terminals, Uijk.

For each level i, a set of $N_P$ groups $G_{i,j}$ of i-th level of user terminals Uijk, j varying from 0 to $N_P-1$, is defined as follows.

To each level i with $1 \le i \le N_L$ corresponds $2^{i-1}$ sets $E_{i,s}$ of time-slot indices, with s varying from 1 to $N_E(i)$ and $N_E(i)$ equal to $2^{i-1}$.

To each level i and each index s(i) of a set $E_{i,s}$, with the index s respecting $1 \le s \le 2^{i-1}$, corresponds $N_{SS}(i)$ acquisition preambles gj with the index j respecting:

$$(s-1)*\left(\frac{N_S}{2^i}\right) \le j \le s*\left(\frac{N_S}{2^i}\right) - 1$$

Each user Uijk belonging to a given group $G_{i,j}$, with k varying from $$0 \text{ to } \frac{N_S}{2^i} - 1,$$

uses the same preamble gj, characterized by its index j with $(s-1)*$ $$\left(\frac{N_S}{2^i}\right) \le j \le s*\left(\frac{N_S}{2^i}\right) - 1.$$

This index j is also the order of a circular shift to be performed on the position of the second replica within the group $G_{i,j}$.

Each user Uijk of the group $G_{i,j}$ sends its first replica and its second replica in two time slots having a first position and a second position P1 (Uijk) and P2 (Uijk) defined in terms of time-slot indices, each of the components of each of the position pairs within the group $G_{i,j}$ being different from those of the others, when said pairs are compared in twos.

Each group $G_{i,j}$ of users Uijk of level i and shift j, i varying from 1 to $N_L$ and j being comprised in the interval $[0, N_P-1]$, is characterized by the datum of a set Rij of triplets R(Uijk) of resources, each formed for k varying from $$0 \text{ to } \frac{N_S}{2^i} - 1:$$

the preamble gj of index j,
a first replica position P1(Uijk),
a second replica position P2(Uijk), The indices i and j being set, the first and second positions of a terminal Uijk are defined by the two relations:

$P1(Uijk) = B_{inf}(i, s) + k,$ and $P2(Uijk) = M(i, s) + \left[j\left(\mod \frac{N_P}{2^{i-1}}\right) + k\right]\left[\mod \frac{N_P}{2^{i-1}}\right]$ the index s respecting the relationship:

$$(s-1)*\left(\frac{N_S}{2^i}\right) \le j \le s*\left(\frac{N_S}{2^i}\right) - 1;$$

and $B_{inf}(i,s)$ being equal to $(s-1)*N_{SS}(i)$ with $N_{SS}(i)$, equal to $$\frac{N_S}{2^{i-1}};$$

and $M(i,s)$ being equal to $$B_{inf}(i,s) + \frac{B_{sup}(i,s) + 1 - B_{inf}(i,s)}{2}$$

and $B_{sup}(i,s)$ being equal to $s*N_{SS}(i)-1$, and the operator $$\mod \frac{N_P}{2^{i-1}}$$

designating the arithmetic operator $$\text{"modulo } \frac{N_P}{2^{i-1}}\text{"}.$$

with Im Im Im I ml Icm.

There are therefore, for each level i, $N_P$ groups $G_{i,j}$, j varying from 1 to $N_P$, each containing $$\frac{N_S}{2^i}$$

user terminals Uijk and using a different acquisition preamble.

In FIGS. 9A, 9B and 9C an example is provided as to the construction of the groups $G_{i,j}$ of user terminals from sets $E_{i,s}$ of frame indices in the particular case where the number $N_S$ of time slots per frame is equal to 8, for a transmitting method employing two replicas, i.e. in which $N_R$ is equal to 2.

In this case, the number $N_P$ of acquisition preambles is equal to 4, the number $N_L$ of levels is equal to 3 and the number $N_U$ of connected terminals of the plurality is equal to 28.

The first and second column of each group $G_0$ show the positions P1, P2 of the first replicas and of the second replicas of the subscribers in this group, respectively.

In FIG. 9A, the four first-level (i=1) groups $G_{1,0}$, $G_{1,1}$, $G_{1,2}$, $G_{1,3}$ (shown from left to right) are associated with acquisition preambles g0, g1, g2 and g3, and each contain four subscribed user terminals, respectively.

The four groups $G_{1,0}$, $G_{1,1}$, $G_{1,2}$, $G_{1,3}$ are each constructed from the set of indices $E_{1,1}=\{0, 1, 2, 3, 4, 5, 6, 7\}$.

From top to bottom, the first column of first position P1 of each group $G_{1,0}$, $G_{1,1}$, $G_{1,2}$, $G_{1,3}$ is the first half of the set $E_{1,1}$. The second column P2 of each group $G_{1,0}$, $G_{1,1}$, $G_{1,2}$, $G_{1,3}$ is obtained from the first column P1 of each group $G_{1,0}$, $G_{1,1}$, $G_{1,2}$, $G_{1,3}$ respectively using a corresponding circular shift of rank j performed within $E_{1,1}$.

In FIG. 9B, the four second-level (i=2) groups $G_{2,0}$, $G_{2,1}$, $G_{2,2}$, $G_{2,3}$ (shown from left to right) are associated with acquisition preambles g0, g1, g2 and g3, and each contain two subscribed user terminals, respectively.

The two groups $G_{2,0}$, $G_{2,1}$ are each constructed from the set of indices $E_{2,1}=\{0, 1, 2, 3\}$.

The two groups $G_{2,2}$, $G_{2,3}$ are each constructed from the set of indices $E_{2,2}=\{4, 5, 6, 7\}$.

From top to bottom, the first column of first position P1 of each group $G_{2,0}$, $G_{2,1}$ is the first half of the set $E_{2,1}$.

From top to bottom, the first column of first position P1 of each group $G_{2,2}$, $G_{2,3}$ is the first half of the set $E_{2,2}$.

The second column P2 of each group $G_{2,0}$, $G_{2,1}$ is obtained from the first column P1 of each group $G_{2,0}$, $G_{2,1}$ using a corresponding circular shift of rank j performed within $E_{2,1}$.

The second column P2 of each group $G_{2,2}$, $G_{2,3}$ is obtained from the first column P1 of each group $G_{2,2}$, $G_{2,3}$ using a corresponding circular shift of rank j performed within $E_{2,2}$.

In FIG. 9C, the four third-level (i=3) groups $G_{3,0}$, $G_{3,1}$, $G_{3,2}$, $G_{3,3}$ (shown from left to right) are associated with acquisition preambles g0, g1, g2 and g3, and each contain one subscribed user terminal, respectively.

The group $G_{3,0}$ is constructed from the set of indices $E_{3,1}=\{0,1\}$. The group $G_{3,1}$ is constructed from the set of indices $E_{3,2}=\{2,3\}$. The group $G_{3,2}$ is constructed from the set of indices $E_{3,2}=\{4,5\}$. The group $G_{3,3}$ is constructed from the set of indices $E_{3,3}=\{6,7\}$.

The first column of first position P1 and the second column of second position P2 of the group $G_{3,0}$ are equal to $\{0\}$ and $\{1\}$, respectively. The first column of first position P1 and the second column of second position P2 of the group $G_{3,1}$ are equal to $\{2\}$ and $\{3\}$, respectively. The first column of first position P1 and the second column of second position P2 of the group $G_{3,2}$ are equal to $\{4\}$ and $\{5\}$, respectively. The first column of first position P1 and the second column of second position P2 of the group $G_{3,3}$ are equal to $\{6\}$ and $\{7\}$, respectively.

Generally, it may be demonstrated that all of the first or second replicas of a first-level group $G_{1,j}$ associated with an acquisition preamble will not interfere with the packets of the second-level group $G_{21}$ associated with the same acquisition preamble.

It may also be demonstrated that each group $G_{i,j}$ of any level i possesses one of the two replica-positioning components, P1 or P2, such that interference with the higher level (i+1) group $G_{i+1,j}$ that is associated therewith, i.e. that uses the same preamble gj, is avoided.

Generally, when a transmitting system according to the invention meets the following criteria:

the number $N_R$ of replicas is set to 2; and there is no restriction on the number of acquisition preambles that may be detected and decoded per time slot; and the transmitting system is synchronous and uses successive interference cancellation; and two terminals cannot use the same two time slots, i.e. do not generate loops, then the maximum number of users $N_U$ of said system that are able to use only detections based on acquisition preambles is equal to Newton's binomial coefficient $$\binom{N_S}{N_P}, \text{ i.e.: } \frac{N_S*(N_S-1)}{2}$$

An algorithm, configured to start the decoding with the packets of the first level allows higher levels to be unlocked one by one.

In FIGS. 10A, 10B, 10C and 10D, a given acquisition preamble, for example the preamble g0, and the worst-case scenario, in which all the users of this acquisition preamble belonging to the various levels have transmitted in the frame, which here comprises 8 time slots, is considered. The parameters $N_S$, $N_P$, $N_L$ considered in this example of a transmitting system, are equal to 8, 4 and 3, respectively.

The first level, designated by "Level 1", uses the set of indices $E_{1,1}=\{0, 1, 2, 3, 4, 5, 6, 7\}$, which is shared by four groups of user terminals, which groups are associated with different acquisition preambles g0, g1, g2, g3, and each contain four user terminals, respectively.

The second level, designated by "Level 2", uses a first set of indices $E_{2,1}=\{0, 1, 2, 3\}$ and a second set of indices $E_{2,2}=\{4, 5, 6, 7\}$. The first set $E_{2,1}$ is shared by two first groups $G_{2,0}$, $G_{2,1}$ of second-level terminals, which groups are associated with acquisition preambles g0, g1, and each contain two user terminals. The second set $E_{2,2}$ is shared by two second groups $G_{2,2}$, $G_{2,3}$ of second-level terminals, which groups are associated with acquisition preambles g2, g3, and each contain two user terminals.

The third level, designated by "Level 3", uses four sets of indices $E_{3,1}=\{0,1\}$, $E_{3,2}=\{0,1\}$, $E_{3,3}=\{0,1\}$, $E_{3,4}=\{0,1\}$ which are respectively associated with groups $G_{3,0}$, $G_{3,1}$, $G_{3,2}$, $G_{3,3}$ of third-level users, which groups are associated with the preambles g0, g1, g2, g3, and each contain one subscriber.

Figures 10A, 10B:
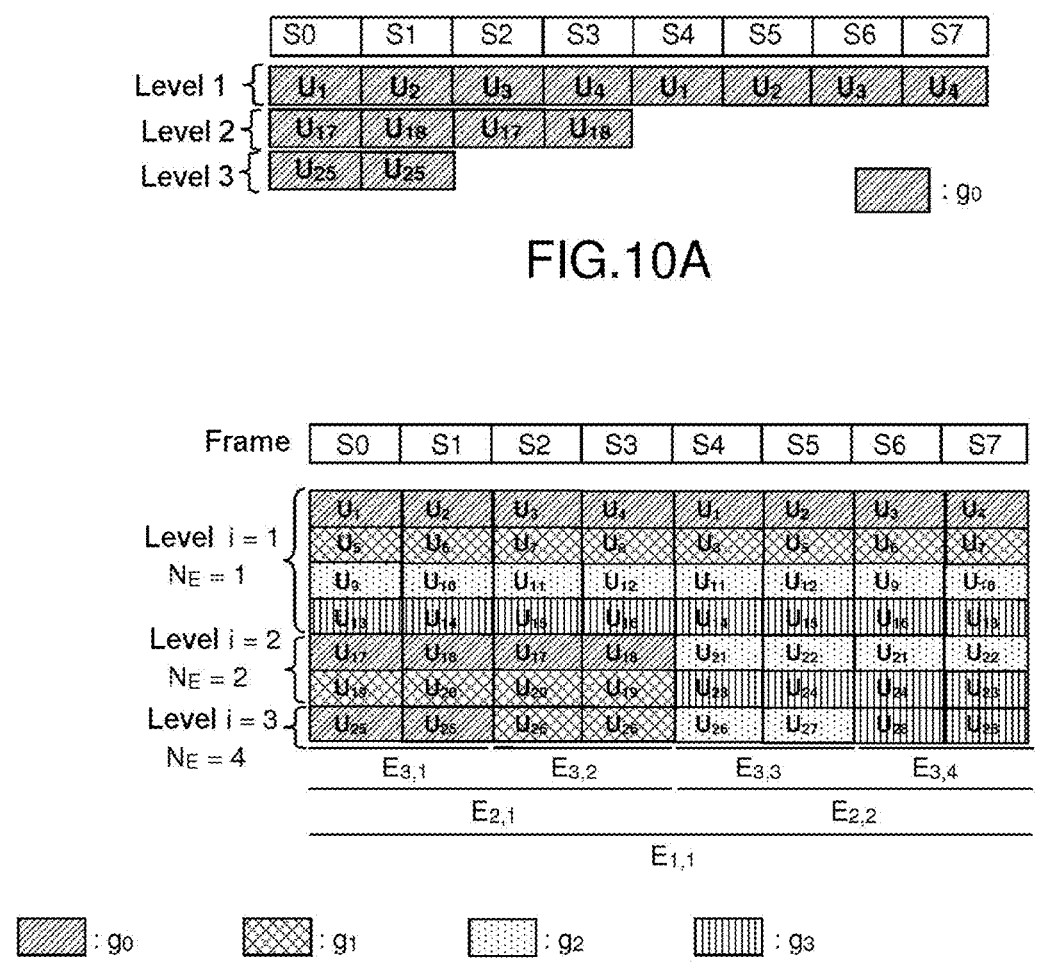

In FIG. 10A, the acquisition preamble g0, by way of example, in level 1 occupies the entire frame, corresponding to the set of slot indices $E_{1,1}=\{0, 1, 2, 3, 4, 5, 6, 7\}$, and in level 2 occupies the time slots corresponding to the set of slot indices $E_{2,1}=\{0, 1, 2, 3\}$, and in level 3 occupies the time slots corresponding to the set of slot indices $E_{3,1}=\{0,1\}$.

It will be noted that the second replicas of level 1 are unique in half of the time slots of the frame. Assuming all the users $U_1$, $U_2$, $U_3$, $U_4$ of this level are decoded by applying SIC, the 2 packets of level 2 $U_{17}$, $U_{18}$ will also have unique second replicas in half of the set of slots $\{0 \ldots 1 \ldots 3\}$. Thus when these two packets have been successfully decoded, the packet $U_{25}$ of level 1 will also be decodable. This is true for any preamble group.

In FIG. 10B, the first-level groups $G_{1,0}$, $G_{1,1}$ of terminals that are associated with the first and second acquisition preambles g0, g1 are configured so as to use their preamble solely in time slots in the right half of the frame, i.e. time slots the indices of which belong to the set $\{4, 5, 6, 7\}$.

The first-level groups $G_{1,2}$, $G_{1,3}$ of terminals that are associated with the second and third acquisition preambles g2, g3 are configured so as to use their preamble solely in time slots in the left half of the frame, i.e. time slots the indices of which belong to the set $\{0, 1, 2, 3\}$.

It may be seen that application of successive interference cancellation (SIC) to packets of level 1 allows the acquisition preambles of the subscriber terminals of level 2 to be made unique and so on. Recurrently, each level of lower level i unlocks the next higher level i+1, until there are no more levels to unlock.

Thus all the "level 1" subscriber terminals, the acquisition preamble of one of the two replicas of which is unique in the time slots of said terminals, i.e. $U_1$, $U_2$, $U_3$, $U_4$, $U_5$, $U_6$, $U_7$, $U_8$, $U_9$, $U_{10}$, $U_1$, $U_{12}$, $U_{13}$, $U_{14}$, $U_{15}$, $U_{16}$, may be detected and decoded.

Figures 10C, 10D, 11:
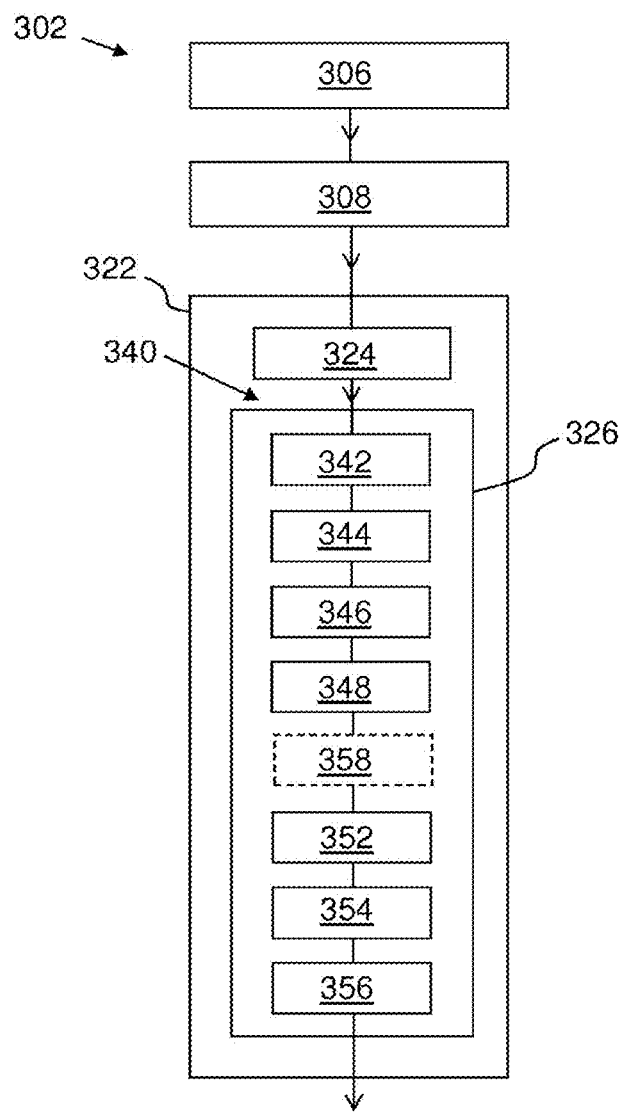

In FIG. 10C, after all the "level 1" packets have been decoded and removed by SIC, the same process is repeated.

Then, the "level 2" user terminals, the acquisition preamble of one of the two replicas of which is unique in the time slots of said terminals, i.e. $U_{17}$, $U_{18}$, $U_{19}$, $U_{20}$, $U_{21}$, $U_{22}$, $U_{23}$, $U_{24}$, may be detected and decoded.

In FIG. 10D, after all the "level 2" packets have been decoded and removed by SIC, the same process is repeated. Only four "level 3" user terminals remain, the acquisition preamble of which is unique in their time slots. These are the user terminals $U_{25}$, $U_{26}$, $U_{27}$, $U_{28}$.

Thus, the technique for constructing groups $G_0$, i varying from 1 to $N_L$ and j varying from 0 to $N_P$, allows inter-slot replica-location correlations not to be carried out. Only acquisition-preamble correlations need to be carried out.

In FIG. 11, the "smart" SPoTIT transmitting method, here designated by the number 302, comprises a first step 306 and a second step 308 by way of a particular embodiment of the first and second steps 106, 108 of FIG. 3, in the particular case where the distributing function F is equal to a smart function $F_{SMART}$ for intelligently distributing resources in terms of acquisition preambles and positions of $N_R$ replicas.

The "smart" SPoTIT transmitting method 302 here comprises, just like the transmitting method 102 of FIG. 3, a second embodiment 322 of the third step 122 of FIG. 3, comprising a fourth step 324 of collecting and decoding packets using a CRD-SA decoding protocol, which is identical to the fourth step 124 of FIG. 1, and a second embodiment 326 of the sixth step 126 of FIG. 1, which comprises a fourth set 340 of substeps.

The substeps of the fourth subset 340 consist in:

in a first substep 342, selecting, in a preset order or according to a preset criterion, a reference time slot in the frame being processed from time slots for which an unresolved packet conflict has been detected; then in a second substep 344, choosing arbitrarily or according to a preset criterion in the selected reference time slot, a detected acquisition sequence chosen from one or more acquisition sequences detected in said reference time slot; then in a third substep 346, determining the positions in the frame being processed of the possible replicas of a given packet associated with the detected and chosen acquisition sequence on the basis of all the positions of the times slots of the frame in which the detected and chosen acquisition sequence has been detected by short correlation and on the basis of the graph $\{u; F_{SMART}(u)\}$, then in a fourth substep 348, identifying, among the time slots of the possible replicas of a given packet having the same chosen detected acquisition sequence, a time slot having only a single replica associated with the chosen acquisition sequence, the associated terminal and the other associated replicas corresponding to the same packet using the graph $\{u; F_{SMART}(L1)\}$, then in a combining fifth substep 352, computing the sum of the baseband signals of the replicas of the identified user terminal, the packet to be decoded of which uses the chosen detected acquisition sequence; then in a sixth substep 354, demodulating and decoding the computed sum when the sum has a noise level located below a set noise threshold; then in a seventh substep 356, subtracting in baseband from the signal being processed the demodulated and decoded signal of the sum of the replicas of the packet in the time slots that are respectively associated with the replicas of the sum.

For example, a criterion of choice of the detected acquisition sequence may be based on a criterion of order of the signal-to-noise ratios of the detected acquisition sequences.

The one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which a correlation peak has a value higher than or equal to a preset first short-correlation threshold.

The one or more detected acquisition sequences are determined by computing a plurality of values of short correlations in baseband between the reference patterns of the possible acquisition sequences expected in the reference time slot and the signals contained in time slots for which the use of the reference patterns expected in the reference time slot is possible by virtue of the graph $\{u; F_{SMART}(U)\}$, and by selecting, as detected acquisition sequences, the acquisition sequences for each of which the sum of the squares of the moduli of the correlation values corresponding to a given reference pattern has a value higher than or equal to a preset second short-correlation threshold.

The detection by short correlation of the one or more acquisition sequences in the reference time slot is performed during the conventional decoding process of the CRD-SA protocol, a little before it fails and is suspended, or in an intermediate substep of detecting by short correlation, which substep is interposed between the first substep 342 and the second substep 344 of the sixth step 326.

The detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between the second substep 344 and the third substep 346 of the sixth step 326.

It will be noted that the sixth step may also comprise an eighth substep 358 of estimating frequency, delay, phase and amplitude parameters of each located replica, serving to compute the sum signal in baseband, the estimating eighth substep 358 being executed after the fourth substep 348 of identifying replicas of the packet to be decoded.

The main performance tests carried out are based on the network load in bits/symbol (symbol G). The dependency of this load on the number $N_U$ of users, the number $N_S$ of slots per frame/virtual frame, the coding rate Rc and the employed modulation order M, is given by:

$$G = \frac{N_u}{N_S} Rc * \log2(M) (\text{bits/symbol})$$

The packet loss ratio (PLR) may therefore be measured for a given load and a given signal-to-noise ratio (SNR) by computing the probability of packet loss in the frame. The bit rate T in bits per symbol is computed as follows: T=G(1−PLR(G))(bits/symbol).

Figure 12:
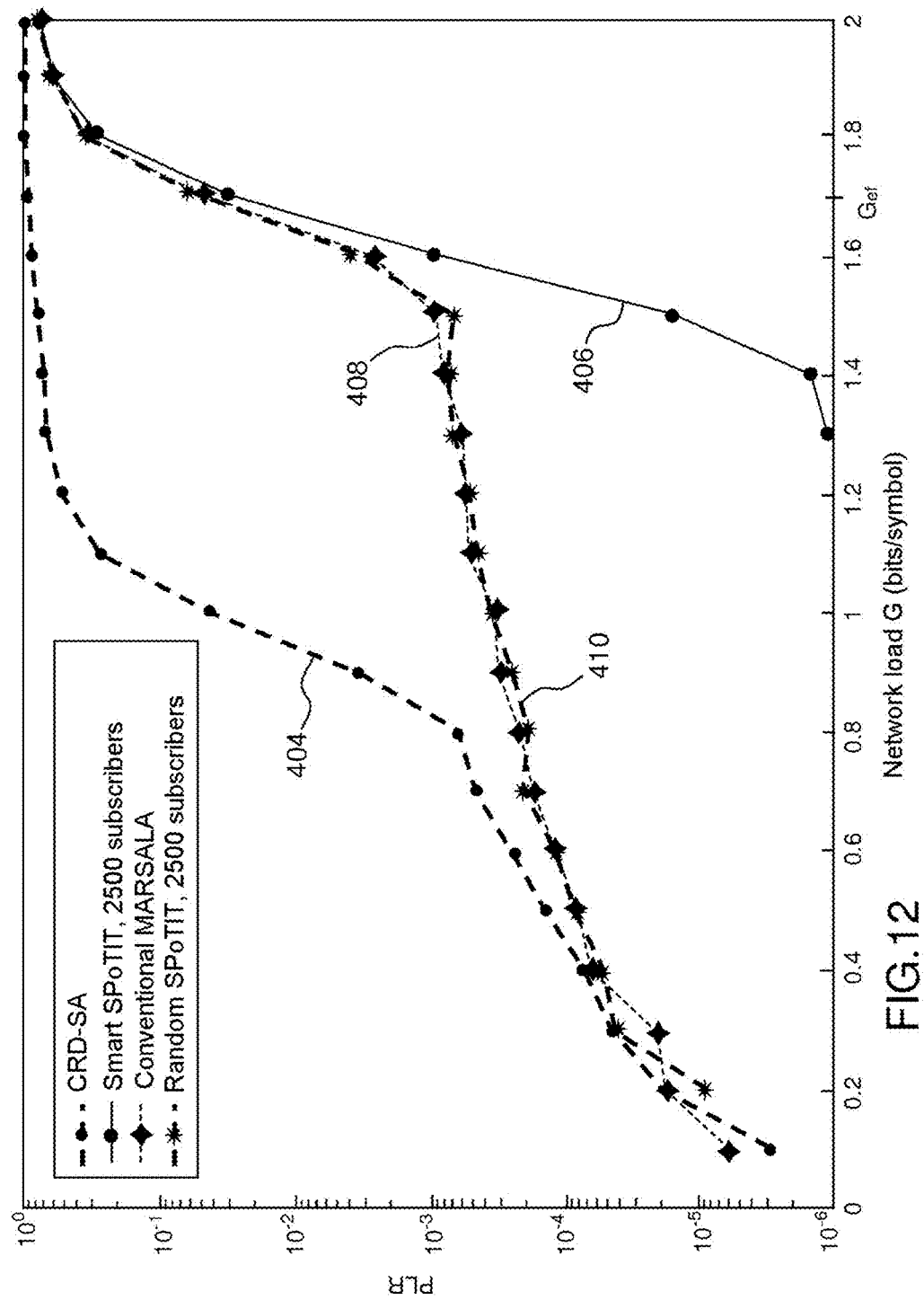
FIG. 12 is a comparative view of four curves of the variation in packet loss rate (PLR) as a function of network load G expressed in bits/symbol, in the case of use of the conventional CRD-SA and MARSALA transmitting methods, and in the case of use of two variants of the transmitting method according to the invention ("random" SPoTIT and "smart" SPoTIT)

In FIG. 12, the variations in packet loss rate (PLR) as a function of network load G, expressed in number of bits per symbol, are compared for four transmitting methods using a different protocol.

QPSK phase modulation (QPSK being the acronym of Quadrature Phase Shift Keying) and a code according to the 3GPP standard, i.e. a rate 1/3 turbo-code, are assumed to be used by the four transmitting methods.

A first curve 404 shows the variation in the packet loss rate (y-axis) as a function of the load G on the network (x-axis) for a transmitting method using a conventional CRD-SA protocol.

A second curve 406 shows the variation in the packet loss rate (y-axis) as a function of the load G on the network (x-axis) for a transmitting method using a "smart"-SPoTIT protocol according to the invention (2500 subscribers limited to the first level with 100 time slots and 50 acquisition preambles).

A third curve 408 shows the variation in the packet loss rate (y-axis) as a function of the load G on the network (x-axis) for a transmitting method using a conventional MARSALA protocol.

A fourth curve 410 shows the variation in the packet loss rate (y-axis) as a function of the load G on the network (x-axis) for a transmitting method using a random-SPoTIT protocol according to the invention (2500 subscribers).

It may clearly be seen from the second curve 406 that the smart-SPoTIT protocol based on optimal management, receiving-station end, of the positions of the replicas and of the choice of the acquisition preambles, and on prevention of loops via use of a unique or else a potential minimum number of a given acquisition preamble in each time slot, improves the (and has the best) performance in terms of PLR by decreasing or removing the floor created by the loops.

Specifically, the error floor is actually lower for an optimum number of subscribers without loops and without location correlations (1500 subscribers per receiving station, 100 time slots per frame, two replicas, as well as for 2500 subscribers of zero loops and a minimum of location correlations). The bit rate remains the same because the collapse occurs at a network load $G_{ef}$ of 1.7 bits/symbol. At this level $G_{ef}$, the packet loss rate (PLR) is degraded in the same way as with the third and fourth curves 408, 410, which are associated with use of the conventional MARSALA and random-SPoTIT protocols, respectively.

It will be noted that the third and fourth curves 408, 410 exhibit an identical improvement in performance in terms of PLR compared to the first curve 404 showing the performances of a transmitting method, though, as will be recalled, the transmitting method using the "random"-SPoTIT protocol is less complex to implement in the event of a failure than the transmitting method using a conventional MARSALA protocol.

Figure 13:
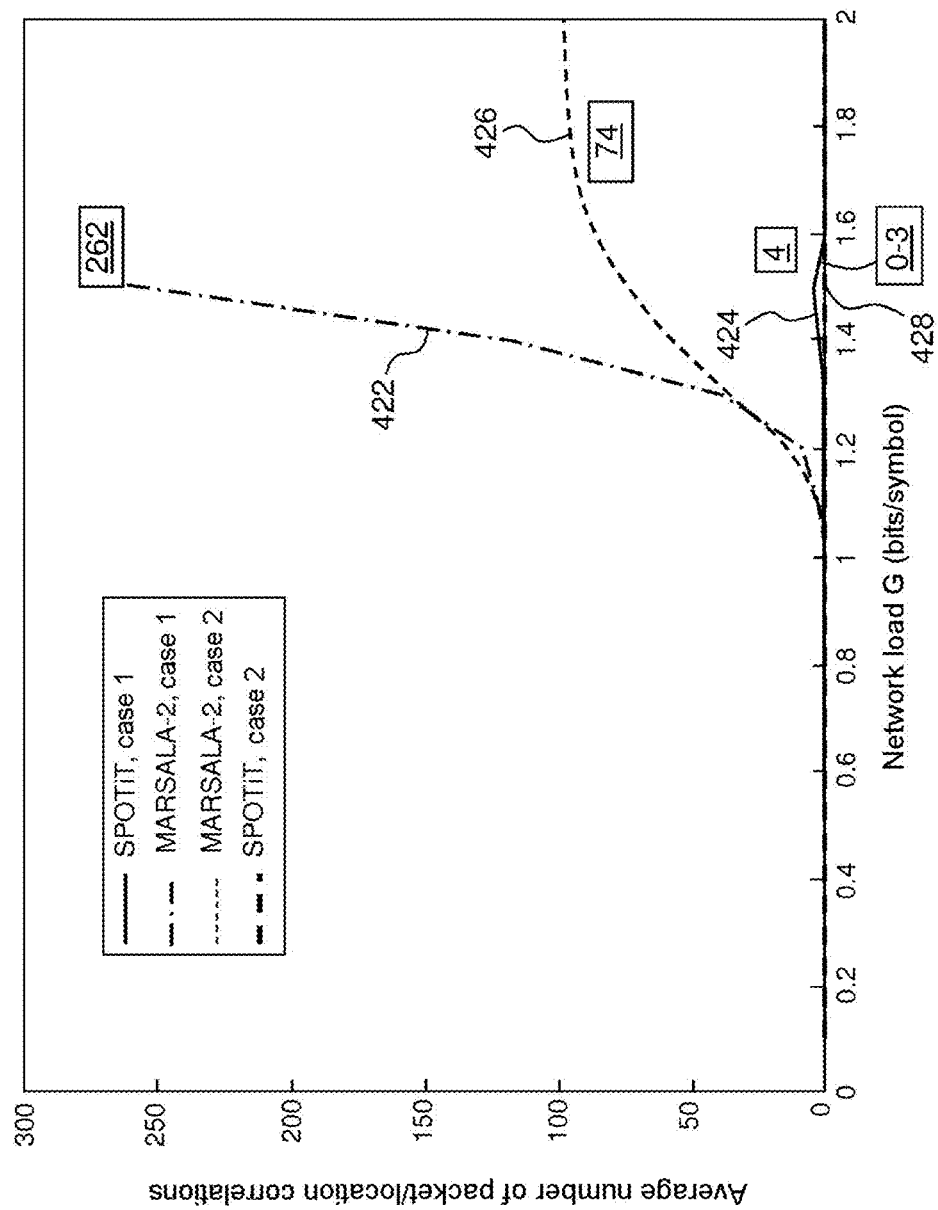
FIG. 13 is a comparative view of four curves of the variation in the average number of location correlations per packet as a function of network load G expressed in bits/symbol, a first pair of said curves corresponding to a transmitting method using a conventional MARSALA protocol and a second pair of said curves using a "random" SPoTIT protocol according to the invention.

In FIG. 13, the variation in the average number of location correlations required to decode a packet has been shown, in the case of a transmitting method using the MARSALA-2 protocol and of a transmitting method using the random-SPOTIT protocol for 2000 subscribers. As the random-SPOTIT and MARSALA protocols may test and scan a packet each time CRD-SA falls over, two cases have been considered.

A first case, designated by "case 1", is the case in which, each time a packet is analyzed with random SPOTiT or MARSALA, location correlations are carried out; this case takes into account the level of the signal-to-noise-plus-interference ratio (SNIR), which is potentially higher because of the SIC of CRD-SA and false alarms that may occur as to correlation peaks.

A second case, designated by "case 2", is the case in which the location correlations used to decode a packet are carried out only once during the first analysis by "random" SPOTiT or MARSALA, it thus being assumed that all the positions of the replicas in the frame are visible from the first analysis and that there are no false alarms.

In the first case, the average number of replica-location correlations per packet increases considerably with the increase in the load on the network G, rising to approximately 262 for a load of 1.5 bits/symbol and for the MARSALA-2 protocol, as shown by the associated first curve 422. This is due to a process whereby decoding alternates back-and-forth between MARSALA decoding on failure and CRD-SA decoding on failure-resolution until both fail. In comparison, "random"-SPOTiT decoding reaches an average maximum of four replica-location correlations for the same load of 1.5 bits/symbol, as shown by the second curve 424.

In the second case, the complexity of MARSALA gradually increases as the effectiveness of the conventional decoding of the CRD-SA protocol decreases, the average number of replica-location correlations per packet increasing with the increase in the load G up to about 98, which corresponds to NS−1, for G equal to 2 bits/symbol, as shown by the third curve 426. In comparison, the decoding of the "random"-SPoTIT protocol reaches a maximum of 0.3 replica correlations, as shown by the fourth curve 428.

Generally, the transmitting method according to the invention may be applied to various communication systems using, for example, regenerative satellites and/or terrestrial wireless connections, or even wired connections.

The invention has been described in the context of satellite communications, but may also be employed in the terrestrial domain. Satellite communications involve random access, which turns out to be practical in the case of the Internet of things or machine-to-machine communication when conventional access methods for allocating resources are unable to provide sufficient resources, with respect to the high number of terminals to be supported. However, it is especially relevant to satellite applications, as it is important to minimize signaling information when the round trip time (RTT) is considerable.

The invention claimed is:

1. A method for transmitting data packets through a random-access (RA) transmission channel shared by a plurality of terminals, the transmitting method being implemented by a communication system comprising:
  a receiving station; and
  a plurality of at least two user terminals that are actively connected to the receiving station, and
  a random-access (RA) transmission channel for transmission from the plurality of user terminals to the receiving station, using a time-diverse random-access protocol with resolution of inter-packet conflict;
  the transmitting method comprising:
  in a preliminary first step performed by the receiving station,
    a function F for assigning and distributing transmission resources F(u) shared by the plurality of user terminals u connected to the receiving station, which function is defined by a graph {(u, F(u)}, wherein u designates an identification and turn index of the user terminals of the plurality of user terminals and the transmission resource F(u) associated with a user terminal u includes positions of an integer number $N_R$, higher than or equal to 2, of replicas of a packet to be sent by the terminal u, selected from ranks of time slots of a send time frame, and an acquisition sequence to be inserted in each of the $N_R$ replicas, selected from a family of quasi-orthogonal pseudo-random binary sequences, is determined; then
    to each connected user terminal u of the plurality of user terminals is delivered an associated component of the graph {(u, F(u)} whereas an entirety of the graph is made available to the receiving station; then
  in a second step, each user terminal u of the plurality of user terminals randomly generates $N_R$ replicas of a packet to be transmitted in the time slots of the send frame having the temporal positions assigned by a graph component of said terminal and wherein is inserted the acquisition binary sequence assigned by the graph component of said terminal; and
  in a third step of decoding received packets, the graph {(u, F(u)} of the assigning and distributing function is exploited by the receiving station to combine signals having the same acquisition signal in the $N_R$ possible positions of replicas of a given packet, in order to minimize, or even decrease to zero, the number of correlations in replica location that are required, between complex baseband data signals of different time slots, during the resolution of inter-packet interference conflicts that are not resolvable using the conventional decoding process of the time-diverse random-access protocol with resolution of inter-packet conflict.

2. The transmitting method as claimed in claim 1, wherein:
  the family of quasi-orthogonal pseudo-random binary sequences is chosen from codes used by code-division multiple-access systems, such as Gold codes and extended-length Gold codes; and
  the acquisition binary sequence is located in the header by way of preamble or inside or in a tail of each replica; and/or
  each transmitted replica comprises one or more guard symbols defining a guard interval.

3. The transmitting method as claimed in claim 1, wherein the second step comprises a sub step of coding the replica with a redundancy check and/or an FEC code, said coding substep being performed before the insertion of an acquisition binary sequence.

4. The transmitting method as claimed in claim 1, wherein the second step comprises a sub step of inserting signaling information, executed before a sub step of coding the replica.

5. The transmitting method as claimed in claim 1, wherein the random transmission channel shared by the user terminals is a wireless return transmission channel and the receiving station is a satellite or a gateway for connection to a terrestrial communication network or a station of a terrestrial communication network.

6. The transmitting method as claimed in claim 1, wherein the decoding third step comprises:
  a fourth step of collecting and decoding packets using a conventional CRD-SA decoding protocol or a fifth step of collecting and decoding packets using an ACRDA protocol, the fourth or fifth step being executed after the first and second steps respectively on a current reception physical frame or in a moving window encompassing a certain number of virtual frames specific to the user terminals; and
  a sixth step of complementary analyzing and processing to decode packets affected by interference that are not resolved in the fourth step or fifth step, the sixth step being triggered when at least one packet affected by interference of the frame is not resolved during the execution of the fourth or fifth step.

7. The transmitting method as claimed in claim 6, wherein the fourth step of collecting and decoding using a conventional CRD-SA decoding protocol comprises a second set of substeps of:
identifying, inside a received signal, replicas that have not been affected by destructive collisions with replicas of other packets; then extracting the information contained in the identified replicas;
temporally locating the one or more other replicas of the same packet using the information on the temporal positions of the replicas delivered by the components of the graph {(u, R(u)} and/or signaling information extracted from the decoded and identified replicas;
erasing, in complex baseband, said one or more other replicas using an interference erasing algorithm, when it or they are affected by destructive collisions with replicas of other packets; and
identifying other packets that, after said erasing substep, are no longer affected by destructive collisions and extracting the information that is contained therein.

8. The transmitting method as claimed in claim 1, wherein:
the function F, designated by $F_{PSR}$ according to a first embodiment, is a pseudo-random deterministic function for assigning and distributing position vectors of the $N_R$ replicas of the packets within the time frame and of the acquisition sequences associated with the packets and each of the replicas thereof that depend on the user terminals of the plurality via an input seed of the function $F_{PSR}$ which depends in a representative way on the identifier of each terminal, the distribution of the vectors of the positions of the $N_R$ replicas and of the acquisition sequences of the distributing function $F_{PSR}$ having a distribution profile that is uniform over the set of all the possible vectors of positions of $N_R$ replicas and of all the possible acquisition sequences when the number of user terminals is at or above a predetermined number of said user terminals.

9. The transmitting method as claimed in claim 8, wherein:
for each user terminal u, the seed x(u) associated with the user terminal u is set temporally and represents the identifier HID(u) of the terminal u; or
for each terminal u, the seed x(u) associated with the user terminal u is dynamic and varies between each frame, this especially being achieved using an algorithm representative of the variations in the product of the identifier HID of the terminal u and an identifier FID of the frame, the latter identifier being representative of a temporal rank of the frame in a sequential order of frame advance.

10. The transmitting method as claimed in claim 8, wherein:
the pseudo-random deterministic distributing function $F_{PSR}$ is parameterized by a total number $N_S$ of time slots per frame and the total number $N_P$ of acquisition sequences.

11. The transmitting method as claimed in claim 8, wherein the sixth step comprises a third set of substeps of:
selecting arbitrarily or according to a preset criterion a reference time slot in the frame being processed from time slots for which an unresolved packet conflict has been detected; then
choosing arbitrarily or according to a preset criterion in the selected reference time slot a detected acquisition sequence chosen from one or more acquisition sequences detected in said reference time slot; then
determining the positions in the frame being processed of the possible replicas of a given packet associated with the detected and chosen acquisition sequence on the basis of all the positions of the times slots of the frame wherein the detected and chosen acquisition sequence has been detected by short correlation and on the basis of the graph {u; $F_{PSR}(u)$}; then
computing the possible replica-location correlations between the baseband signal received in the reference time slot and the band signals of the time slots having the positions determined in substep; then
determining the time slots of the replicas of the packet of the time slot associated with the chosen detected acquisition sequence to be the time slots having a location-correlation value higher than a preset location-correlation value; then
in a combining substep, computing the sum of the baseband signals of the located replicas of the packet of the time slot associated with the chosen detected acquisition sequence; then
demodulating and decoding the computed sum when the sum has a noise level located below a set noise threshold; then
subtracting in baseband from the signal being processed the demodulated and decoded signal of the located replicas of the packet of the time slot associated with the chosen detected acquisition sequence.

12. The transmitting method as claimed in claim 11, wherein:
the one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which a correlation peak has a value higher than or equal to a preset first short-correlation threshold, or
the one or more detected acquisition sequences are determined by computing a plurality of values of short correlations in baseband between the reference patterns of the possible acquisition sequences expected in the reference time slot and the signals contained in time slots for which the use of the reference patterns expected in the reference time slot is possible by virtue of the graph {u; $F_{PSR}(u)$}, and by selecting, as detected acquisition sequences, the acquisition sequences for each of which the sum of the squares of the moduli of the correlation values corresponding to a given reference pattern has a value higher than or equal to a preset second short-correlation threshold.

13. The transmitting method as claimed in claim 11, wherein:
the detection by short correlation of the one or more acquisition sequences in the reference time slot is performed during the conventional decoding process of the CRD-SA protocol, a little before it fails and is suspended, or in an intermediate substep of detecting by short correlation, which substep is interposed between substeps and of the sixth step; and
the detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between substeps and of the sixth step.

14. The transmitting method as claimed in claim 11, further comprising a substep of estimating frequency, delay, phase and amplitude parameters of each located replica, serving to compute a sum signal in baseband, the estimating sub step being executed after the replica-locating substep.

15. The transmitting method as claimed in claim 1, wherein:
the function F for assigning and distributing resources, which is designated by $F_{SMART}$ according to a second embodiment, is a "smart" deterministic function for assigning and distributing position vectors of the $N_R$ replicas within each frame among the set of all the possible vectors of positions of $N_R$ replicas in all of the time slots of the frame and of the acquisition sequences associated with the various sent replicas among all the possible acquisition sequences, determined so as to minimize, or even decrease to zero, the number of possible data loops wherein the connected user terminals of the plurality use the same replica positions.

16. The transmitting method as claimed in claim 15, wherein:
the graph $\{(u, F_{SMART}(u)\}$ is determined so as to make correspond, to each used acquisition sequence gj of the set $\{gj\}$ of acquisition sequences, a set Tj of user terminals Ujk and a plurality of vectors Vjk(Pgj(1), ..., Pgj($N_R$)) of positions of $N_R$ replicas, which differ from one another in at least one position.

17. The transmitting method as claimed in claim 16, wherein:
the number $N_R$ of replicas transmitted per packet is equal to two, and
the number of time slots per frame is an even number, and
the number $N_P$ of acquisition sequences gj of the set $\{gj\}$ of acquisition sequences is equal to half the number $N_S$ of time slots per frame, j designating an identification index of the acquisition sequence varying from 0 to $N_p-1$; and
the cardinal $N_U$ of the plurality of user terminals is equal to the maximum number of user terminals using only detections based on the acquisition sequences, according to the relationship:

$N_U=N_S*N_S/4.$

18. The transmitting method as claimed in claim 16, wherein:
the number $N_R$ of replicas transmitted per packet is equal to two, and
the number $N_S$ of time slots for each frame is a power of 2 that is written: $N_S=2^{N_L}$, $N_L$ designating the number of circular-shift levels, and
the number $N_P$ of acquisition sequences gj of the set $\{gj\}$ of acquisition sequences is equal to half the number $N_S$ of time slots per frame, j designating an identification index of the acquisition sequence varying from 0 to $N_p-1$; and
the cardinal $N_U$ of the plurality of user terminals is equal to the maximum number of user terminals using only detections based on the acquisition sequences, according to the relationship:

$N_U=N_S*(N_S-1)/2.$

19. The transmitting method as claimed in claim 15, wherein the sixth step comprises a fourth set of substeps of:
selecting arbitrarily or according to a preset criterion a reference time slot in the frame being processed from time slots for which an unresolved packet conflict has been detected; then
choosing arbitrarily or according to a preset criterion in the selected reference time slot a detected acquisition sequence chosen from one or more acquisition sequences detected in said reference time slot; then
determining the positions in the frame being processed of the possible replicas of a given packet associated with the detected and chosen acquisition sequence on the basis of all the positions of the times slots of the frame wherein the detected and chosen acquisition sequence has been detected by short correlation and on the basis of the graph $\{u; F_{SMART}(u)\}$; then
among the time slots of the possible replicas of a given packet having the same chosen detected acquisition sequence, identifying a time slot having only a single replica associated with the chosen acquisition sequence, the associated terminal and the other associated replicas corresponding to the same packet using the graph $\{u; F_{SMART}(u)\}$; then
in a combining substep, computing the sum of the baseband signals of the replicas of the identified user terminal, the packet to be decoded of which uses the chosen detected acquisition sequence; then
demodulating and decoding the computed sum when the sum has a noise level located below a set noise threshold; then
subtracting in baseband the demodulated and decoded signal of the replicas from the sum of the signal being processed in the time slots respectively associated with the replicas of the sum.

20. The transmitting method as claimed in claim 19, wherein:
the one or more detected acquisition sequences are determined by computing values of peaks in short correlations in baseband between the reference patterns of the expected possible acquisition sequences and the signal contained in the selected reference time slot, and by selecting, as detected acquisition sequences, the acquisition sequences for each of which a correlation peak has a value higher than or equal to a preset first short-correlation threshold, or
the one or more detected acquisition sequences are determined by computing a plurality of values of peaks in short correlations in baseband between the reference patterns of the possible acquisition sequences expected in the reference time slot and the signals contained in time slots for which the use of the reference patterns expected in the reference time slot is possible by virtue of the graph $\{u; F_{SMART}(u)\}$, and by selecting, as detected acquisition sequences, the acquisition sequences for each of which the sum of the squares of the moduli of the correlation values corresponding to a given reference pattern has a value higher than or equal to a preset second short-correlation threshold.

21. The transmitting method as claimed in claim 19, wherein:
the detection by short correlation of the one or more acquisition sequences in the reference time slot is performed during the conventional decoding process of the CRD-SA protocol, a little before it fails and is suspended, or in an intermediate substep of detecting by short correlation, which substep is interposed between substeps and of the sixth step; and
the detection by short correlation of the chosen detected sequence in the remaining time slots of the time frame being processed is performed during the conventional decoding process of the CRD-SA protocol, a little before it fails and is suspended, or in an intermediate substep of detecting by short correlation, which substep is interposed between substeps and of the sixth step.

22. The transmitting method as claimed in claim 19, wherein the sixth step furthermore comprises a substep of estimating frequency, delay, phase and amplitude parameters of each located replica, serving to compute a sum signal in baseband, the estimating substep being executed after the substep of identifying a time slot having only a single replica associated with the chosen acquisition sequence.

23. A communication system for transmitting data packets through a random-access (RA) transmission channel shared by a plurality of terminals, comprising:
   a receiving station; and
   a plurality of at least two user terminals that are actively connected to the receiving station, and
   a random-access (RA) transmission channel for transmission from the plurality of user terminals to the receiving station, using a time-diverse random-access protocol with resolution of inter-packet conflict;
   the communication system being wherein:
   the receiving station is configured to determine and/or store, in a preliminary first step, a function F for assigning and distributing transmission resources F(u) shared by the plurality of user terminals u connected to the receiving station, which function is defined by a graph {(u, F(u)}, wherein u designates an identification and turn index of the user terminals of the plurality and the transmission resource F(u) associated with a user terminal u includes temporal positions of an integer number $N_R$, higher than or equal to 2, of replicas of a packet to be sent by the terminal u, selected from ranks of time slots of a send time frame, and an acquisition sequence to be inserted in each of the $N_R$ replicas, selected from a family of quasi-orthogonal pseudo-random sequences; and
   each connected user terminal u is configured, in a first step, to receive or generate the associated component of the graph {(u, F(u)}; then, in a second step, to randomly generate $N_R$ replicas of a packet to be transmitted in the time slots of the send frame having the temporal positions assigned by the graph component of said terminal and wherein is inserted the acquisition binary sequence assigned by the graph component of said terminal; and
   the receiving station is configured, in a third step of decoding received packets, to exploit the graph {(u, F(u)} of the assigning and distributing function to combine signals having the same acquisition signal in the $N_R$ possible positions of replicas of a given packet, in order to minimize, or even decrease to zero, the number of correlations in replica location that are required, between complex baseband data signals of different time slots, during the resolution of inter-packet interference conflicts that are not resolvable using the conventional decoding process of the time-diverse random-access protocol with resolution of inter-packet conflict.

24. The communication system as claimed in claim 23, wherein:
   the function F, designated by $F_{PSR}$ according to a first embodiment, is a pseudo-random deterministic function for assigning and distributing position vectors of the $N_R$ replicas of the packets within the time frame and of the acquisition sequences associated with the packets and each of the replicas thereof that depend on the user terminals of the plurality via an input seed of the function $F_{PSR}$ which depends in a representative way on the identifier of each terminal, the distribution of the vectors of the positions of the $N_R$ replicas and of the acquisition sequences of the distributing function $F_{PSR}$ having a distribution profile that is uniform over the set of all the possible vectors of positions of $N_R$ replicas and of all the possible acquisition sequences when the number of user terminals is at or above a predetermined number of said user terminals.

25. The communication system as claimed in claim 23, wherein:
   the function F for assigning and distributing resources, which is designated by $F_{SMART}$ according to a second embodiment, is a "smart" deterministic function for assigning and distributing position vectors of the $N_R$ replicas within each frame among the set of all the possible vectors of positions of $N_R$ replicas in all of the time slots of the frame and of the acquisition sequences associated with the various sent replicas among all the possible acquisition sequences, determined so as to minimize, or even decrease to zero, the number of possible data loops wherein the connected user terminals of the plurality use the same replica positions.

* * * * *